United States Patent
Park

(10) Patent No.: US 12,490,282 B2
(45) Date of Patent: Dec. 2, 2025

(54) METHOD AND DEVICE FOR SELECTING RESOURCE IN WIRELESS COMMUNICATION SYSTEM

(71) Applicant: Innovative Technology Lab Co., Ltd., Seoul (KR)

(72) Inventor: Dong Hyun Park, Seoul (KR)

(73) Assignee: Innovative Technology Lab Co., Ltd., Seoul (KR)

(*) Notice: Subject to any disclaimer, the term of this patent is extended or adjusted under 35 U.S.C. 154(b) by 429 days.

(21) Appl. No.: 18/192,007

(22) Filed: Mar. 29, 2023

(65) Prior Publication Data

US 2023/0239900 A1 Jul. 27, 2023

Related U.S. Application Data

(63) Continuation of application No. PCT/KR2021/013247, filed on Sep. 28, 2021.

(30) Foreign Application Priority Data

Sep. 29, 2020 (KR) .................. 10-2020-0127058

(51) Int. Cl.
*H04W 72/25* (2023.01)
(52) U.S. Cl.
CPC .................. *H04W 72/25* (2023.01)
(58) Field of Classification Search
CPC ..... H04L 1/0026; H04L 1/004; H04L 1/0072; H04L 1/1607; H04L 1/1893;
(Continued)

(56) References Cited

U.S. PATENT DOCUMENTS

2019/0132893 A1 5/2019 Lu et al.
2023/0141004 A1* 5/2023 Hong ............... H04W 72/1263
370/311

(Continued)

FOREIGN PATENT DOCUMENTS

KR 10-1982247 B1 5/2019
KR 10-2020-0015506 A 2/2020
(Continued)

OTHER PUBLICATIONS

International Search Report for International Patent Application No. PCT/KR2021/013247, dated Jan. 6, 2022.
(Continued)

*Primary Examiner* — Thomas R Cairns

(57) ABSTRACT

Provided may be a method of supporting, by a user equipment (UE), sidelink communication in a wireless communication system. The method. of supporting, by the UE, sidelink communication in the wireless communication system may include receiving a coordination request from a transmitting UE (Tx UE); generating a coordination message based on the coordination request; and transmitting the generating coordination message to the Tx UE. Here, the coordination request may include 1-bit information and the coordination request may be received based on at least one of a physical resource set of Physical Sidelink Feedback Channel (PSFCH), a Sidelink Control Information (SCI) format, Cyclic Redundancy Checking (CRC) scrambling, and a Demodulation Reference Signal (DMRS) sequence, and the Tx UE may perform resource reselection based on the coordination message.

19 Claims, 18 Drawing Sheets

(58) Field of Classification Search
CPC ... H04L 5/0035; H04L 5/0051; H04L 5/0053; H04W 4/023; H04W 4/40–48; H04W 4/70; H04W 36/06; H04W 72/02; H04W 72/20; H04W 72/25; H04W 72/40; H04W 84/20; H04W 92/18
See application file for complete search history.

(56) References Cited

U.S. PATENT DOCUMENTS

| | | | | |
|---|---|---|---|---|
| 2023/0156669 A1* | 5/2023 | Zhou | ............... | H04W 72/02 370/329 |
| 2023/0262737 A1* | 8/2023 | Wang | ............... | H04W 72/25 370/329 |
| 2023/0389051 A1* | 11/2023 | Leon Calvo | ......... | H04W 72/25 |
| 2024/0260064 A1* | 8/2024 | Leon Calvo | ......... | H04W 76/14 |

FOREIGN PATENT DOCUMENTS

| | | |
|---|---|---|
| WO | 2016-182295 A1 | 11/2016 |
| WO | 2020-033088 A1 | 2/2020 |
| WO | 2020-064643 A1 | 4/2020 |

OTHER PUBLICATIONS

Written Opinion for International Patent Application No. PCT/KR2021/013247, dated Jan. 6, 2022.
"3rd Generation Partnership Project; Technical Specification Group Radio Access Network; NR; Multiplexing and channel coding (Release 16)", Jun. 2020, pp. 1-151, 3GPP TS 38.212 V16.2.0, 3GPP Organizational Partners.
"3rd Generation Partnership Project; Technical Specification Group Radio Access Network; NR; Physical layer procedures for control (Release 16)", Jun. 2020, pp. 1-176, 3GPP TS 38.213 V16.2.0, 3GPP Organizational Partners.
"3rd Generation Partnership Project; Technical Specification Group Radio Access Network; NR; Physical layer procedures for data (Release 16)", Jun. 2020, pp. 1-163, 3GPP TS 38.214 V16.2.0, 3GPP Organizational Partners.
"3rd Generation Partnership Project; Technical Specification Group Radio Access Network; NR; NR and NG-RAN Overall Description; Stage 2 (Release 16)," Jul. 2020, pp. 1-148, 3GPP TS 38.300 V16.2.0, 3GPP Organizational Partners.
"3rd Generation Partnership Project; Technical Specification Group Radio Access Network; NR; Radio Resource Control (RRC) protocol specification (Release 16)," Jul. 2020, pp. 1-906, 3GPP TS 38.331 V16.1.0, 3GPP Organizational Partners.
"Feasibility and benefits of mode 2 enhancements for inter-UE coordination", 3GPP Draft; R1-2006445, 3GPP, Mobile Competence Centre ; 650, Route des Lucioles ; F-06921 Sophia-Antipolis Cedex; France, vol. RAN WG1, No. e-Meeting; Aug. 17, 2020-Aug. 28, 2020.
"Summary for AI 8.11.2.2 Feasibility and benefits for mode 2 enhancements", 3GPP Draft; R1-2007412, 3rd 3GPP, Mobile Competence Centre ; 650, Route des Lucioles ; F-06921 Sophia-Antipolis Cedex; France, vol. RAN WG1, No. ••Meeting; Aug. 17, 2020-Aug. 28, 2020.
"Considerations on inter-UE coordination for mode 2 enhancemens", 3GPP Draft; R1-2005546, 3rd Generation Partnership Project (3GPP), Mobile Competence Center; 650, Route des Lucioles; F-06921 Sophia-Antipolis Ceddex; France, vol. RAN WG1, No. e-Meeting; Aug. 17, 2020-Aug. 28, 2020.
EESR—Extended European Search Report, issued by European Patent Office, on Jan. 22, 2025, for the European Patent Application No. 21875996.7.

* cited by examiner

FIG. 4

| V2V | Reserved | Reserved | Tolling | Control | I2V | PVD/Security |
|---|---|---|---|---|---|---|
| CH 1 | CH 2 | CH 3 | CH 4 | CH 5 | CH 6 | CH 7 |

5,855   5,865   5,875   5,885   5,895   5,905   5,915   5,925 MHz

C-V2X (covering CH 6 and CH 7)

METHOD AND DEVICE FOR SELECTING RESOURCE IN WIRELESS COMMUNICATION SYSTEM

CROSS-REFERENCE TO RELATED APPLICATIONS

This application is a continuation of international patent application No. PCT/KR2021/013247, filed on Sep. 28, 2021, which claims priority from and the benefit of Korean Patent Application No. 10-2020-0127058, filed on Sep. 29, 2020, each of which is hereby incorporated by reference in its entirety.

BACKGROUND

The present disclosure relates to a method and apparatus for selecting resource in wireless communication system. More particularly, the present disclosure relates to a method and apparatus for selecting resource in wireless communication system in New Radio (NR) vehicle-to-everything (V2X).

International Mobile Telecommunication (IMT) framework and standard have been developed by the International Telecommunication Union (ITU). Also, continuous discussion for 5-th generation (5G) communication is ongoing through a program called "IMT for 2020 and beyond".

To satisfy the requirements requested by "IMT for 2020 and beyond", various proposals have been made to support various numerologies about a time-frequency resource unit standard by considering various scenarios, service requirements, and potential system compatibility in a 3-rd Generation Partnership Project (3GPP) new radio (NR) system.

Also, to overcome a poor channel environment, such as high pathloss, phase-noise, and frequency offset, occurring on a high carrier frequency, the NR system may support transmission of a physical signal/channel through a plurality of beams. Through this, the NR system may support applications, for example, enhanced Mobile Broadband (eMBB), massive Machine Type Communications (mMTC)/ultra Machine Type Communications (uMTC), and Ultra Reliable and Low Latency Communications (URLLC).

Also, Vehicle-to-everything (V2X) communication, a communication method of exchanging or sharing road infrastructures during driving and information, such as traffic conditions, through communication with other vehicles, may be considered. V2X may include, for example, vehicle-to-vehicle (V2V), which may refer to long term evolution (LTE)-based/New Radio (NR) based communication between vehicles, vehicle-to-pedestrian (V2P), which may refer to LTE-based/NR-based communication between a vehicle and a user equipment (UE) carried by a user, and vehicle-to-infrastructure/network (V2I/N), which may refer to LTE-based/NR-based communication between a vehicle and a roadside unit (RSU)/network. The RSU may be a transportation infrastructure entity configured by a base station or a fixed terminal, such as, an entity that transmits a speed notification to a vehicle.

However, in an environment where a plurality of UEs, a collision between resources for V2X may occur, thereby causing a delay in V2X communication.

SUMMARY

A technical subject of the present disclosure may provide a method and apparatus for selecting resource in wireless communication system.

A technical subject of the present disclosure may provide a method and apparatus for selecting resource for V2X communication.

A technical subject of the present disclosure may provide a method and apparatus for selecting sidelink resource of a UE through a coordination user equipment (C-UE).

A technical subject of the present disclosure may provide a method and apparatus for requesting resource coordination to the C-UE.

A technical subject of the present disclosure may provide a method and apparatus for explicitly requesting resource coordination to the C-UE.

A technical subject of the present disclosure may provide a method and apparatus for C-UE to recognize a specific condition and situation and perform resource coordination procedure.

Technical subjects achievable from the present disclosure are not limited to the aforementioned technical subjects and still other technical subjects not described herein may be clearly understood by one of ordinary sill in the art to which the disclosure pertains from the following description.

According to an aspect of the present disclosure, a method of supporting, by a user equipment (UE), sidelink communication in a wireless communication system may be provided. Here, the method of supporting, by the UE, sidelink communication may include receiving a coordination request from a transmitting UE (Tx UE); generating a coordination message based on the coordination request; and transmitting the generated coordination message to the Tx UE. Here, the coordination request may include 1 bit or more information bits and the coordination request may be received based on at least one of a physical resource set of Physical Sidelink Feedback Channel (PSFCH), a Sidelink Control Information (SCI) format, Cyclic Redundancy Checking (CRC) scrambling, and a Demodulation Reference Signal (DMRS) sequence, and the Tx UE may perform resource reselection based on the coordination message.

According to an aspect of the present disclosure, a method of supporting, by a UE, sidelink communication in a wireless communication system may be provided. The method of supporting, by the UE, sidelink communication may include verifying a triggering condition for a coordination resource procedure; generating a coordination message based on the triggering condition when the triggering condition is satisfied; and transmitting the generated coordination message to a Tx UE. Here, the Tx UE may perform resource reselection based on the coordination message.

According to the present disclosure, it is possible to provide a method and apparatus for preventing collision and selecting a resource for vehicle-to-everything (V2X) communication.

According to the present disclosure, it is possible to provide a method and apparatus for allowing a transmitting user equipment (Tx UE) to select a sidelink resource based on information received from a coordination UE (C-UE) and preventing resource collision not recognized by the Tx UE.

According to the present disclosure, it is possible to provide a method and apparatus for allowing a C-UE to directly determine situations of neighboring Tx UEs and trigger a resource coordination procedure and preventing resource collision not recognized by the Tx UEs.

According to the present disclosure, it is possible to provide a method and apparatus for performing a resource coordination procedure by explicitly signaling 1-bit (or more bits of) information such that a Tx UE may trigger coordination message transmission.

According to the present disclosure, it is possible to provide a method and apparatus for determining a signaling format for a coordination request that is explicitly signaled by a Tx UE.

A technical subject of the present disclosure may provide a method and apparatus for explicitly requesting a resource coordination to a C-UE.

A technical subject of the present disclosure may provide a method and apparatus for enhancing reliability of sidelink communication of a Tx UE that directly selects a resource in such a manner that a C-UE performs a resource coordination procedure by recognizing a specific condition and situation.

The features briefly abstracted above with respect to the present disclosure are merely aspects of the detailed description of this disclosure and are not provided to limit the scope of the disclosure.

BRIEF DESCRIPTION OF DRAWINGS

FIG. 4 illustrates an NR sidelink frequency to which the present disclosure may apply.

DETAILED DESCRIPTION OF THE ILLUSTRATED EMBODIMENTS

Figure 1:
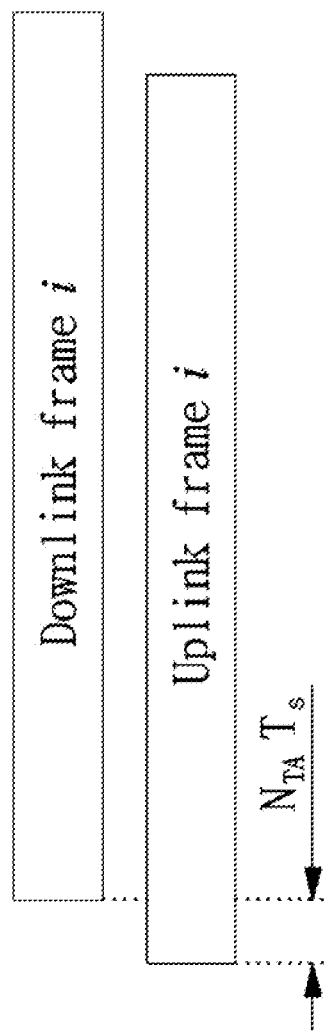
FIG. 1 illustrates an example of a new radio (NR) frame structure to which the present disclosure may apply.

Various examples of the present disclosure will be described more fully hereinafter with reference to the accompanying drawings such that one of ordinary skill in the art to which the present disclosure pertains may easily implement the examples. However, the present disclosure may be implemented in various forms and is not limited to the examples described herein.

In describing the examples of the present disclosure, detailed description on known configurations or functions may be omitted for clarity and conciseness. Throughout the drawings and the detailed description, unless otherwise described, the same drawing reference numerals are understood to refer to the same elements, features, and structures.

It will be understood that when an element is referred to as being "connected to," "coupled to," or "accessed to" another element, it can be directly connected, coupled, or accessed to the other element or intervening elements may be present. Also, it will be further understood that when an element is described to "comprise/include" or "have" another element, it specifies the presence of still another element, but do not preclude the presence of another element uncles otherwise described.

Further, the terms, such as first, second, and the like, may be used herein to describe elements in the description herein. The terms are used to distinguish one element from another element. Thus, the terms do not limit the element, an arrangement order, a sequence or the like. Therefore, a first element in an example may be referred to as a second element in another example. Likewise, a second element in an example may be referred to as a first element in another example.

Herein, distinguishing elements are merely provided to clearly explain the respective features and do not represent that the elements are necessarily separate from each other. That is, a plurality of elements may be integrated into a single hardware or software unit. Also, a single element may be distributed to a plurality of hardware or software units. Therefore, unless particularly described, the integrated or distributed example is also included in the scope of the present disclosure.

Herein, elements described in various examples may not be necessarily essential and may be partially selectable. Therefore, an example including a partial set of elements described in an example is also included in the scope of the present disclosure. Also, an example that additionally includes another element to elements described in various examples is also included in the scope of the present disclosure.

The description described herein is related to a wireless communication network, and an operation performed in a wireless communication network may be performed in a process of controlling a network and transmitting data by a system that controls a wireless network, e.g., a base station, or may be performed in a user equipment connected to the wireless communication network.

It is apparent that various operations performed for communication with a terminal in a network including a base station and a plurality of network nodes may be performed by the base station or by other network nodes in addition to the base station. Here, the term 'base station (BS)' may be interchangeably used with other terms, for example, a fixed station, a Node B, eNodeB (eNB), gNodeB (gNB), and an access point (AP). Also, the term 'terminal' may be interchangeably used with other terms, for example, user equipment (UE), a mobile station (MS), a mobile subscriber station (MSS), a subscriber station (SS), and a non-AP station (non-AP STA).

Herein, transmitting or receiving a channel includes a meaning of transmitting or receiving information or a signal through the corresponding channel. For example, transmitting a control channel indicates transmitting control information or a signal through the control channel. Likewise, transmitting a data channel indicates transmitting data information or a signal through the data channel.

In the following description, although the term "new radio (NR) system" is used to distinguish a system according to various examples of the present disclosure from the existing system, the scope of the present disclosure is not limited thereto.

A new radio (NR) system supports various subcarrier spacings (SCSs) by considering various scenarios, service requirements, potential system compatibility, and the like. Also, to overcome a poor channel environment, such as high pathloss, phase-noise, and frequency offset, occurring on a high carrier frequency, the NR system may support transmission of a physical signal/channel through a plurality of beams. Through this, the NR system may support applications, for example, enhanced Mobile Broadband (eMBB), massive Machine Type Communications (mMTC)/ultra Machine Type Communications (uMTC), and Ultra Reliable and Low Latency Communications (URLLC).

Here, 5G mobile communication technology may be defined by including the existing Long Term Evolution-Advanced (LTE-A) system as well as the aforementioned NR system. That is, 5G mobile communication technology may operate by considering backward compatibility with a previous system as well as a newly defined NR system. Therefore, following 5G mobile communication may include technology operating based on the NR system and a technology operating based on a previous system (e.g., LTE-A, LTE), and is not limited to a specific system.

First of all, the physical resource structure of the NR system to which the present disclosure is applied will be briefly described.

FIG. 1 illustrates an example of an NR frame structure according to an embodiment of the present disclosure.

In NR, a basic unit of a time domain may be $T_c=1/(\Delta f_{max} \cdot N_f)$. Here, $\Delta f_{max}=480 \cdot 10^3$ and $N_f=4096$. Also, $\kappa=T_s/T_c=64$ may be a constant about a multiple relationship between an NR time unit and an LTE time unit. In LTE, $T_s=1/(\Delta f_{ref} \cdot N_{f,ref})$, $\Delta f_{ref}=15 \cdot 10^3$ and $N_{f,ref}=2048$ may be defined as a reference time unit.

Referring to FIG. 1, a time structure of a frame for a downlink/uplink (DL/UL) transmission may include $T_f=(\Delta f_{max}N_f/100) \cdot T_s=10$ ms. Here, a single frame may include 10 subframes corresponding to $T_{sf}=(\Delta f_{max}N_f/1000) \cdot T_s=1$ ms. The number of consecutive orthogonal frequency division multiplexing (OFDM) symbols per subframe may be $N_{symb}^{subframe,\mu}=N_{symb}^{slot}N_{slot}^{subframe,\mu}$. Also, each frame may be divided into two half frames and the half frames may include 0~4 subframes and 5~9 subframes. Here, half frame 1 may include 0~4 subframes and half frame 2 may include 5~9 subframes.

$N_{TA}$ represent the timing advance (TA) between downlink (DL) and uplink (UL). Here, a transmission timing of uplink transmission frame i is determined based on a downlink reception timing at a UE according to the following Equation 1.

$$T_{TA}=(N_{TA}+N_{TA,offset})T_c \quad \text{[Equation 1]}$$

$N_{TA,offset}$ denotes a TA offset value occurring due to a duplex mode difference and the like. Basically, in a frequency division duplex (FDD), $N_{TA,offset}=0$. In a time division duplex (TDD), $N_{TA,offset}$ may be defined as a fixed value by considering a margin for a DL-UL switching time. For example, in the TDD (Time Division Duplex) of RF1 (Frequency Range 1) which is a sub-6 GHz or less frequency, $N_{TA,offset}$ may be $39936T_c$ or $2600T_C$. $39936T_C=20.327$ μs and $25600T_C=13.030$ μs. Also, in FR2 (Frequency Range 2) which is millimeter wave (mmWave), $N_{TA,offset}$ may be $13792T_C$. At this time, $39936T_C=7.020$ μs.

Figure 2:
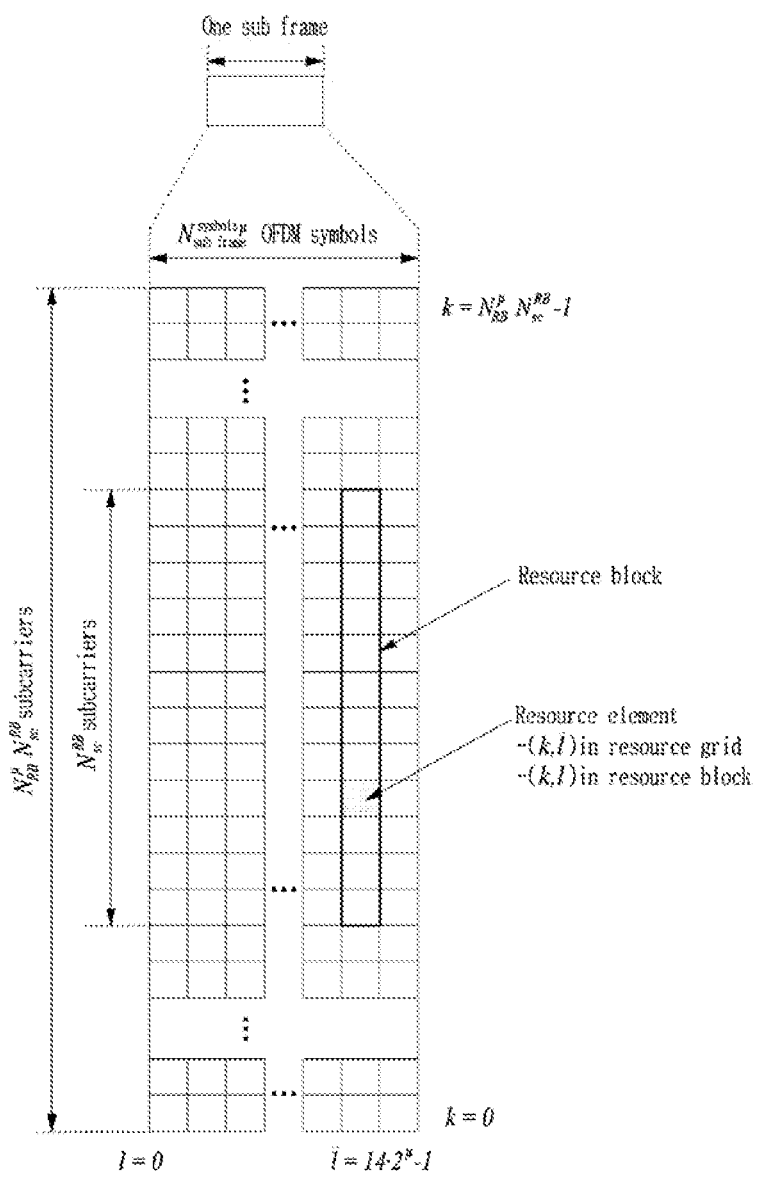
FIG. 2 illustrates an NR resource structure to which the present disclosure may apply.

FIG. 2 illustrates an NR resource structure to which the present disclosure can be applied.

A resource element within a resource grid may be indexed based on each subcarrier spacing. Here, a single resource grid may be generated for each antenna port and for each subcarrier spacing. Uplink/downlink transmission and reception may be performed based on a corresponding resource grid.

A resource block (RB) on a frequency domain is configured of 12 REs and for every 12 Res, an index for one RB ($n_{PRB}$) may be configured. The index for RB may be utilized within a specific frequency band or system bandwidth. The index for RB may be defined as shown in Equation 2 below. Here, $N^{RB}_{sc}$ represents the number of subcarriers per one RB and k represents subcarrier index.

$$n_{PRB} = \left\lfloor \frac{k}{N_{sc}^{RB}} \right\rfloor \quad \text{[Equation 2]}$$

Numerologies may be variously configured to meet various services and requirements of the NR system. For example, one subcarrier spacing (SCS) may be supported in the LTE/LTE-A system, but a plurality of SCSs may be supported in the NR system.

A new numerology for the NR system that supports the plurality of SCSs may operate in frequency range or carrier, such as 3 GHz or less, 3 GHz-6 GHz, 6 GHZ-52.6 GHz, or 52.6 GHz or more, to solve an issue that a wide bandwidth is unavailable in frequency range or carrier such as 700 MHz or 2 GHz.

Table 1 below shows an example of the numerologies supported by the NR system.

TABLE 1

| u | $\Delta f = 2^u \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

Referring to the above Table 1, the numerologies may be defined based on an SCS, a cyclic prefix (CP) length, and the number of OFDM symbols per slot, which are used in an OFDM system. The aforementioned values may be provided to a UE through upper layer parameters, DL-BWP-mu and DL-BWP-cp, for the downlink, and through upper layer parameter, UL-BWP-mu and UL-BWP-cp, for the uplink.

Also, for example, referring to the above Table 1, if μ=2 and SCS=60 kHz, a normal CP and an extended CP may be applied. In other bands, only the normal CP may be applied.

Here, a normal slot may be defined as a basic time unit used to transmit a single piece of data and control information in the NR system. A length of the normal slot may basically include 14 OFDM symbols. Also, dissimilar to a slot, a subframe may have an absolute time length corresponding to 1 ms in the NR system and may be used as a reference time for a length of another time section. Here, for coexistence and backward compatibility of the LTE and the NR system, a time section, such as an LTE subframe, may be required for an NR standard.

For example, in the LTE, data may be transmitted based on a transmission time interval (TTI) that is a unit time. The TTI may include at least one subframe unit. Here, even in the LTE, a single subframe may be set to 1 ms and may include 14 OFDM symbols (or 12 OFDM symbols).

Also, in the NR system, a non-slot may be defined. The non-slot may refer to a slot having the number of symbols less by at least one symbol than that of the normal slot. For example, in the case of providing a low latency such as an Ultra-Reliable and Low Latency Communications (URLLC) service, a latency may decrease through the non-slot having the number of slots less than that of the normal slot. Here, the number of OFDM symbols included in the non-slot may be determined based on a frequency range. For example, a non-slot with 1 OFDM symbol length may be considered in the frequency range of 6 GHz or more. As another example, the number of symbols used to define the non-slot may include at least two OFDM symbols. Here, the range of the number of OFDM symbols included in the non-slot may be configured with a length of a mini slot up to (normal slot length)−1. Here, although the number of OFDM symbols may be limited to 2, 4, or 7 as a non-slot standard, it is provided as an example only.

Also, for example, an SCS corresponding to μ=1 and 2 may be used in the unlicensed band of 6 GHz or less and an SCS corresponding to μ=3 and 4 may be used in the unlicensed band above 6 GHz. Here, for example, if μ=4, it may be used for a synchronization signal block (SSB)

TABLE 2

| u | $N^{slot}_{symb}$ | $N^{frame, u}_{slot}$ | $N^{subframe, u}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Table 2 shows the number of OFDM symbols per slot ($N^{slot}_{symb}$), the number of slots per frame ($N^{frame,\mu}_{slot}$), and the number of slots per subframe ($N^{subframe,\mu}_{slot}$) for the normal CP by subcarrier spacing setting. In Table 2, the values are based on the normal slot having 14 OFDM symbols.

TABLE 3

| u | $N^{slot}_{symb}$ | $N^{frame,u}_{slot}$ | $N^{subframe,u}_{slot}$ |
|---|---|---|---|
| 2 | 12 | 40 | 4 |

In Table 3, in the case of the extended CP applied (that is, μ=2 and SCS=60 kHz), shows the number of slots per frame and the number of slots per subframe based on the normal slot of which the number of OFDM symbols per slot is 12.

As described above, a single subframe may correspond to 1 ms on a time axis. Also, a single slot may correspond to 14 symbols on the time axis. For example, a single slot may correspond to 7 symbols on the time axis. Therefore, the number of slots and the number of symbols that may be considered may be differently set within 10 ms corresponding to a single radio frame. Table 4 may show the number of slots and the number of symbols according to each SCS. Although SCS of 480 kHz may not be considered in Table 4, the present disclosure is not limited to such examples.

TABLE 4

| SCS | Number of slots in 10 ms 14 symbols in 1 slot) | Number of slots in 10 ms 7 symbols in 1 slot) | Number of symbols in 10 ms |
|---|---|---|---|
| 15 kHz | 10 | 20 | 140 |
| 30 kHz | 20 | 40 | 280 |
| 60 kHz | 40 | 80 | 560 |
| 120 kHz | 80 | 160 | 1120 |
| 240 kHz | 160 | 320 | 2240 |
| 480 kHz | 320 | 640 | 4480 |

The V2X service may support a set of basic requirements for V2X services. The requirements are designed basically in sufficient consideration of a road safety service. Here, V2X UEs may exchange autonomous status information through a sidelink. Also, V2X UEs may exchange the information with infrastructure nodes and/or pedestrians.

The V2X service (e.g., LTE Rel-15) may support at least one of a carrier aggregation in a sidelink, a high order modulation, a latency reduction, a transmit (Tx) diversity, and sTTI (Transmission Time Interval). For this purpose, new features may be applied to the V2X communication. More particularly, V2X UE may operate in consideration of coexistence with other V2X UEs. For example, V2X UE may use the same resource pool as other V2X UEs.

For example, technical features may be classified largely based on four categories as represented by the following Table 5 by considering use cases for supporting a V2X service as system aspect (SA) 1, but are not limited thereto. In Table 5, "Vehicles Platooning" may be technology that enables a plurality of vehicles to dynamically form a group and similarly operate. "Extended Sensors" may be technology that enables exchange of data gathered from sensors or video images. "Advanced Driving" may be technology that enables a vehicle to drive based on semi-automation or full-automation. "Remote Driving" may be technology for remotely controlling a vehicle and technology for providing an application. Based thereon, further description related thereto may be given by the following Table 5.

TABLE 5

| Vehicles Platooning |
|---|
| Vehicles Platooning enables the vehicles to dynamically form a platoon travelling together. All the vehicles in the platoon obtain information from the leading vehicle to manage this platoon. The information allows the vehicles to drive closer than normal in a coordinated manner, going to the same direction and travelling together. |

TABLE 5-continued

Extended Sensor

Extended Sensor enables the exchange of raw
or processed data gathered through local
sensors or live video images among vehicles,
road site units, devices of pedestrian and
V2X application servers. The vehicles can increase
the perception of their environment
beyond of what their own sensors can detect and
have a more broad and holistic view of
the local situation. High data rate is
one of the key characteristics.

Advanced Driving

Advanced Driving enables semi-automated or
full-automated driving. Each vehicle
and/or RSU shares its own perception data obtained
from its local sensors with vehicles
in proximity and that allows vehicles to synchronize
and coordinate their trajectories or
maneuvers. Each vehicle shares its driving
intention with vehicles in proximity too.

Remote Driving

Remote Driving enables a remote driver or a
V2X application to operate a remote
vehicle for those passengers who cannot drive
by themselves or remote vehicles located
in dangerous environments. For a case
where variation is limited and routes are
predictable, such as public transportation,
driving based on cloud computing can be
used. High reliability and low latency are the main requirements.

Also, the SA1 may support the case of operating in various systems (e.g., LTE and NR) as enhanced V2X (eV2X) support technology for supporting the V2X service. For example, an NR V2X system may be a first V2X system. Also, an LTE V2X system may be a second V2X system. That is, the NR V2X system and the LTE V2X system may be different V2X systems.

The following describes a method for satisfying low latency and high reliability required in an NR sidelink based on the NR V2X system. However, the same or similar composition may be expanded and applied to the LTE V2X system, and is not limited to following examples. That is, in the LTE V2X system, the present disclosure may apply to an interactable portion.

Here, NR V2X capability may not be limited to essentially supporting only V2X services and V2X RAT to be used may be selected.

As a detailed example, a physical channel, a signal, a basic slot structure, and a physical resource may be configured for the NR V2X. Here, an NR Physical Sidelink Shared Channel (NR PSSCH) may be a physical layer NR sidelink (SL) data channel. V2X UEs may exchange data and control information (e.g., $2^{nd}$ SCI, CSI) through the NR PSSCH. An NR Physical Sidelink Control Channel (NR PSCCH) may be a physical layer NR SL control channel. The NR PSCCH refers to a channel for transmitting scheduling information of the NR SL data channel and control information ($1^{st}$ Sidelink Control Information (SCI)) including $2^{nd}$ SCI indication. That is, a V2X UE may transmit control information for sidelink data communication to another V2X UE through PSCCH. An NR Physical Sidelink Feedback Channel (NR PSFCH) refers to a channel for transmitting physical layer NR Hybrid Automatic Repeat Request (HARQ) feedback information and a channel for transmitting HARQ-ACK feedback information corresponding to the NR SL data channel (i.e., PSSCH). The V2X UE may transmit data to another V2X UE and then may receive HARQ feedback information of the corresponding data through NR PSFCH. An NR Sidelink Synchronization Signal/Physical Sidelink Broadcast Channel (SLSS/PSBCH) block refers to a channel block in which an NR sidelink synchronization signal and a broadcast channel are transmitted in a single consecutive time. Here, the SLSS/PSBCH block may be periodically transmitted based on a set of one or more block indexes to support beam-based transmission in an NR frequency band. The synchronization signal includes a Primary Sidelink Synchronization Signal (PSSS) and a Secondary Sidelink Synchronization Signal (SSSS). The synchronization signal is generated based on at least one SLSSID value. The NR Physical Sidelink Broadcast Channel (PSBCH) refers to a channel for transmitting system information required to perform V2X sidelink communication. The NR PSBCH is transmitted with the SLSS and periodically transmitted based on a set of SLSS/PSBCH block indexes to support beam-based transmission.

Figure 3:
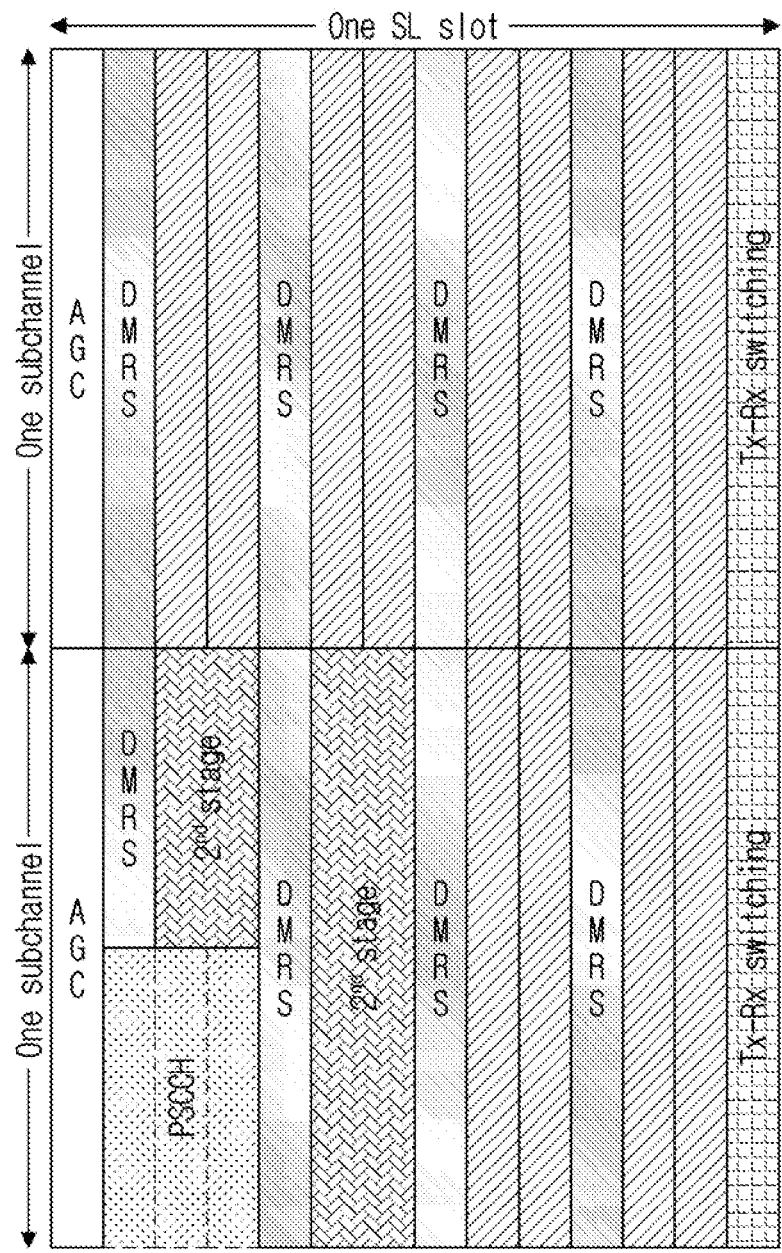
FIG. 3 illustrates an NR sidelink slot structure to which the present disclosure may apply.

FIG. 3 illustrates an NR sidelink slot structure to which the present disclosure may apply.

Referring to FIG. 3, a single sidelink slot (SL slot) includes a single automatic gain control (AGC) symbol. Also, a single SL slot includes a single Tx-Rx switching symbol. In a single SL slot, the PSSCH that is a channel through which data is transmitted is transmitted through at least one subchannel (e.g., two subchannels in FIG. 3). Also, in a time domain, PSCCH ($1^{st}$ SCI), $2^{nd}$ SCI, PSSCH (Data), and demodulation RS (DMRS) for demodulation may be transmitted to remaining OFDM symbols excluding the AGC symbol and the Tx-Rx switching symbol. In detail, locations of PSCCH ($1^{st}$ SCI), $2^{nd}$ SCI, PSSCH (Data), and DMRS for demodulation may be the same as in FIG. 3, but are not limited thereto. For example, in FIG. 3, PSCCH and $2^{nd}$ SCI are present in the first subchannel and PSSCH and DMRS may be allocated considering this. As another example, the second subchannel refers to a subchannel in which PSCCH and $2^{nd}$ SCI are absent and PSSCH and DMRS may be allocated as in FIG. 3.

Here, the number of PSSCH DMRSs may be configured according to an upper layer configuration and one or more PSSCH DMRSs may be configured according to a channel environment of UE. PSCCH ($1^{st}$ SCI) receives demodulation using DMRS of PSCCH (i.e., PSCCH DMRS) and is equally allocated and transmitted every four resource elements (REs) within a single resource block (RB). On the contrary, $2^{nd}$ SCI is decoded using PSSCH DMRS.

FIG. 4 illustrates an NR sidelink frequency to which the present disclosure may apply. For example, NR sidelink may operate based on at least one of Frequency Range 1 (FR1) (sub 6 GHz) and Frequency Range 2 (FR2) (i.e., up to 52.6 GHz), unlicensed ITS bands, and licensed band.

In detail, for example, referring to FIG. 4, 5,855 to 5,925 MHz may be allocated for an ITS service (technology neutral manner).

Also, NR V2X quality of service (QoS) requirements may be considered. That is, delay, reliability, and a data rate may need to satisfy a predetermined condition as requirements for an NR V2X service. Here, the requirements may be configured as in Table 6 below and Table 7 may show PC5 QoS for NR V2X.

Here, to satisfy QoS requirements, access stratum (AS) level QoS management may be required. To this end, HARQ and CSI feedback associated with link adaptation may be required. Also, each of NR V2X UEs may have a different maximum bandwidth capability (max. BW capability). Considering this, AS level information that includes at least one of UE capability, QoS related information, radio bearer configuration, and physical layer configuration may be exchanged between NR V2X UEs.

TABLE 6

Delay: [3, 100 ms]
Reliability: [90%, 99.999%]
Data rate: up to 1 Gbps (TS22.186)

TABLE 7

| PQI Value | Resource Type | Default Priority Level | Packet Delay Budget | Packet Error Rate | Default Maximum Data Burst Volume | Default Averaging Window | Example Services |
|---|---|---|---|---|---|---|---|
| 1 | GBR (NOTE 1) | 3 | 20 ms | $10^{-4}$ | N/A | 2000 ms | Platooning between UEs-Higher degree of automation; Platooning between UE and RSU-Higher degree of automation |
| 2 | | 4 | 50 ms | $10^{-2}$ | N/A | 2000 ms | Sensor sharing-higher degree of automation |
| 3 | | 3 | 100 ms | $10^{-4}$ | N/A | 2000 ms | Information sharing for automated driving-between UEs or UE and RSU-higher degree of automation |
| 55 | Non-GBR | 3 | 10 ms | $10^{-4}$ | N/A | N/A | Cooperative lane change-higher degree of automation |
| 56 | | 6 | 20 ms | $10^{-1}$ | N/A | N/A | Platooning informative exchange-low degree of automation; Platooning-information sharing with RSU |
| 57 | | 5 | 25 ms | $10^{-1}$ | N/A | N/A | Cooperative lane change-lower degree of automation |
| 58 | | 4 | 100 ms | $10^{-2}$ | N/A | N/A | Sensor information sharing-lower degree to an RSU |
| 59 | | 6 | 500 ms | $10^{-1}$ | N/A | N/A | Platooning-reporting to an RSU |
| 82 | Delay Critical GBR (NOTE 1) | 3 | 10 ms | $10^{-4}$ | 2000 bytes | 2000 ms | Cooperative collision avoidance; Sensor sharing-Higher degree of automation; Video sharing-higher degree of automation |
| 83 | | 2 | 3 ms | $10^{-5}$ | 2000 bytes | 2000 ms | Emergency trajectory alignment; Sensor sharing-Higher degree of automation |

NOTE 1:
GBR and Delay Critical GBR PQIs can only be used for unicast PC5 communications.
Editor's note: It is FFS if GBR and Delay Critical GBR can also be used for broadcast and groupcast.
NOTE 1:
For standardized PQI to QoS characteristics mapping, the table will be extended/updated to support service requirements for other identified V2X services.
NOTE 2:
The PQIs may be used for other services than V2X.

Hereinafter, a sidelink HARQ procedure is described. Whether V2X UE is to report HARQ feedback is indicated by upper layer (e.g., RRC) configuration and SCI signaling (e.g., $2^{nd}$ SCI). For example, when the V2X UE performs communication based on a groupcast, whether to report the HARQ feedback may be determined based on a distance between a transmitting UE (Tx UE) and a receiving UE (Rx UE).

When the V2X UE performs at least one of unicast and groupcast, sidelink HARQ feedback may be enabled or disabled. Here, enabling/disabling of the HARQ feedback may be determined based on at least one of a channel condition (e.g., RSRP), a distance between Tx UE and Rx UE, and QoS requirements.

In the case of groupcast, whether to transmit HARQ feedback may be determined based on a physical distance between the Tx UE and the Rx UE. Here, when the HARQ feedback is performed based on the groupcast, the Rx UE may operate by feeding back a negative response only when PSSCH decoding fails. It may be an option 1 operation. On the other hand, when HARQ feedback is performed based on the groupcast, the Rx UE may operate by feeding back a positive response or a negative response based on whether PSSCH decoding succeeds and it may be an option 2 operation. In the option 1 operation of feeding back only a negative response as HARQ NACK based on the groupcast, if the physical distance between the Tx UE and the Rx UE is less than or equal to communication range requirements, feedback on PSSCH may be performed. On the contrary, if the physical distance between the Tx UE and the Rx UE is greater than the communication range requirements, the V2X UE may not perform feedback on PSSCH.

Here, a location of the Tx UE is indicated to the Rx UE through SCI associated with the PSSCH. The Rx UE may estimate a distance from the Tx UE based on information included in SCI and its location information and may operate as above.

Also, when unicast communication is performed based on V2X, a case in which sidelink HARQ feedback is enabled may be considered. The Rx UE may generate and transmit HARQ ACK/NACK for PSSCH depending on whether decoding of a corresponding transport block (TB) succeeds.

Then, an NR sidelink resource allocation mode refers to a mode in which a base station schedules a sidelink transmission resource. Here, a mode in which the base station schedules a sidelink transmission resource may be mode 1. For example, when the V2X UE is located within base station coverage, the V2X UE may receive sidelink resource information from the base station. On the contrary, there is a mode in which the V2X UE directly determines a resource for sidelink transmission between a sidelink resource configured by the base station/network and a pre-configured sidelink resource. Here, a mode in which the UE directly determines a sidelink transmission resource may be mode 2.

Also, a sidelink received signal strength indicator (SL RSSI) is defined as an average value (in [W]) of total received power measured from subchannels configured within OFDM symbols of a slot configured for PSCCH and PSSCH.

Also, the V2X UE may measure a sidelink Channel busy ratio (SL CBR) in slot n. Here, CBR measurement is performed within CBR measurement window ([n−a, n−1]). The CBR measurement window is configured based on an upper layer parameter value "timeWindowSize-CBR" and the above a value has one value of 100 or 100·2$^\mu$ slots. The CBR measurement refers to a value used to define a ratio of subchannels having an SL-RSSI value exceeding a predetermined threshold among subchannels in the entire resource pool.

Figure 5:
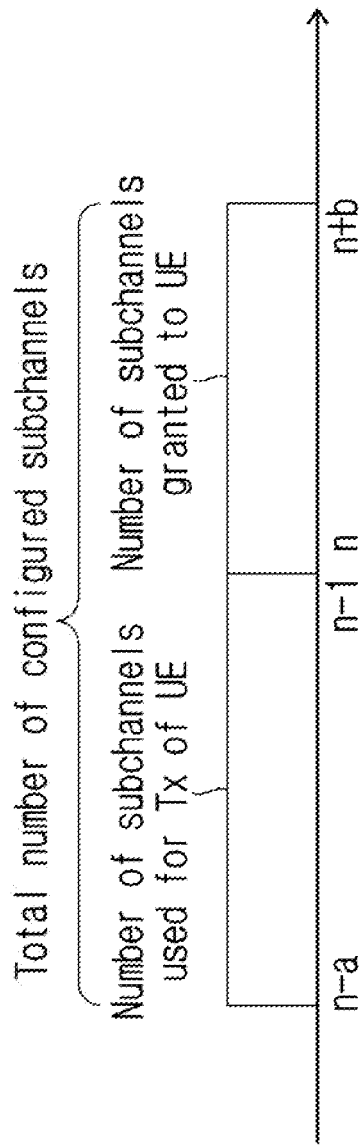
FIG. 5 illustrates a method of measuring a Channel Busy Ratio (CBR) to which the present disclosure may apply.

For example, FIG. 5 illustrates a method of measuring a Channel occupancy Ratio (CR) to which the present disclosure may apply.

Referring to FIG. 5, V2X UE may measure a CR in slot n. Here, slots up to [n−a, n+b] are slots allowed for the V2X UE and slots [n−a, n−1] are slots used by the V2X UE for SL transmission. In slot n, a CR value may be a value acquired by dividing a total number of subchannels in [n−a, n−1] and a total number of subchannels in [n, n+b] by a total number of subchannels configured in a transmission resource pool corresponding to time [n−a, n+b].

In detail, a has a positive value at all times in a time section (slots [n−a, n−1]) used for sidelink transmission. On the contrary, b within time (slots [n, n+b]) for counting the number of subchannels of a resource allowed for UE has a value of 0 or a positive value. Values of a and b are determined to satisfy all the conditions of a+b+1=1000 or 1000·2$^\mu$ slots and b<(a+b+1)/2 by UE implementation. As another example, values of a and b are set to use one value of 1000 or 1000·2$^\mu$ slots by upper layer parameter "timeWindowSize-CR". Also, a value of n+b should not exceed a last transmission occasion of grant for current transmission. Here, a slot for CBR and CR may be a physical slot and the CBR and the CR may be measured every time transmission is performed.

When the V2X UE performs sidelink HARQ feedback transmission, the V2X UE may transmit feedback information based on PSFCH format 0. Here, PSFCH format 0 sequence may be generated based on Zadoff-Chu (ZC) sequence and sequence x(n) is generated based on the following Equation 3. The ZC sequence is generated through a that is a cyclic sequence, based on $\bar{r}_{u,v}(n)$ that is a base sequence. Here, the ZC sequence refers to a sequence that has the same size and is generated based on a cyclic sequence and is generated based on the following Equation 4. In Equation 4, $M_{ZC}=m_{sc}^{RB}/2^\delta$ denotes a length of a sequence, m denotes a value corresponding to the number of RBs to which the sequence is allocated, and δ=0 for PSFCH format 0.

$$x(n)=r_{u,v}^{\alpha,\delta}(n), n=0,1,\ldots,N_{sc}^{RB}-1 \quad \text{[Equation 3]}$$

$$r_{u,v}^{(\alpha,\delta)}(n)=e^{j\alpha n}\bar{r}_{u,v}(n), 0\leq n<M_{ZC} \quad \text{[Equation 4]}$$

Here, a plurality of base sequences is divided into sequence group number (u∈{0, 1, . . . , 29}) and base sequence V number in a corresponding group. One base sequence v=0 or two base sequences v=0/v=1 are configured in a sequence group according to a ZC sequence length. For example, when a PSFCH format is mapped on a single Physical Resource Block (PRB), only a single base sequence (v=0) may be present in the sequence group. Also, for example, sequence group number (u) may be determined based on hopping ID, but is not limited thereto. Here, if a sequence length is less than 36 (e.g., $M_{ZC} \in \{6,12,18,24\}$), the base sequence may be determined based on the following Equation 5.

$$\bar{r}_{u,v}(n)=e^{j\varphi(n)\pi/4}, 0\leq n\leq M_{ZC}-1 \quad \text{[Equation 5]}$$

In Equation 5, a value of φ(n) may be determined based on the following Table 8. (e.g., sequence length $M_{ZC}$=12). However, it is provided as an example only, if the sequence length differs, the value may be determined based on another table value.

TABLE 8

| u | φ(0), . . . , φ(11) | | | | | | | | | | | |
|---|---|---|---|---|---|---|---|---|---|---|---|---|
| 0 | −3 | 1 | −3 | −3 | −3 | 3 | −3 | −1 | 1 | 1 | 1 | −3 |
| 1 | −3 | 3 | 1 | −3 | 1 | 3 | −1 | −1 | 1 | 3 | 3 | 3 |
| 2 | −3 | 3 | 3 | 1 | −3 | 3 | −1 | 1 | 3 | −3 | 3 | −3 |
| 3 | −3 | −3 | −1 | 3 | 3 | 3 | −3 | 3 | −3 | 1 | −1 | −3 |
| 4 | −3 | −1 | −1 | 1 | 3 | 1 | 1 | −1 | 1 | −1 | −3 | 1 |
| 5 | −3 | −3 | 3 | 1 | −3 | −3 | −3 | −1 | 3 | −1 | 1 | 3 |
| 6 | 1 | −1 | 3 | −1 | −1 | −1 | −3 | −1 | 1 | 1 | 1 | −3 |
| 7 | −1 | −3 | 3 | −1 | −3 | −3 | −3 | −1 | 1 | −1 | 1 | −3 |
| 8 | −3 | −1 | 3 | 1 | −3 | −1 | −3 | 3 | 1 | 3 | 3 | 1 |
| 9 | −3 | −1 | −1 | −3 | −3 | −1 | −3 | 3 | 1 | 3 | −1 | −3 |
| 10 | −3 | 3 | −3 | 3 | 3 | −3 | −1 | −1 | 3 | 3 | 1 | −3 |
| 11 | −3 | −1 | −3 | −1 | −1 | −3 | 3 | 3 | −1 | −1 | 1 | −3 |
| 12 | −3 | −1 | 3 | −3 | −3 | −1 | −3 | 1 | −1 | −3 | 3 | 3 |
| 13 | −3 | 1 | −1 | −1 | 3 | 3 | −3 | −1 | −1 | −3 | −1 | −3 |
| 14 | 1 | 3 | −3 | 1 | 3 | 3 | 3 | 1 | −1 | 1 | −1 | 3 |
| 15 | −3 | 1 | 3 | −1 | −1 | −3 | −3 | −1 | −1 | 3 | 1 | −3 |
| 16 | −1 | −1 | −1 | −1 | 1 | −3 | −1 | 3 | 3 | −1 | −3 | 1 |
| 17 | −1 | 1 | 1 | −1 | 1 | 3 | 3 | −1 | −1 | 1 | −3 | 1 |
| 18 | −3 | 1 | 3 | 3 | −1 | −1 | −3 | 3 | 3 | −3 | 3 | −3 |
| 19 | −3 | −3 | 3 | −3 | −1 | 3 | 3 | 3 | −1 | −3 | 1 | −3 |
| 20 | 3 | 1 | 3 | 1 | 3 | −3 | −1 | 1 | 3 | 1 | −1 | −3 |
| 21 | −3 | 3 | 1 | 3 | −3 | 1 | 1 | 1 | 3 | −3 | 3 | |
| 22 | −3 | 3 | 3 | 3 | −1 | −3 | −3 | −1 | −3 | 1 | 3 | −3 |
| 23 | 3 | −1 | −3 | 3 | −3 | −1 | 3 | 3 | 3 | −3 | −1 | −3 |
| 24 | −3 | −1 | 1 | −3 | 1 | 3 | 3 | 3 | −1 | −3 | 3 | 3 |
| 25 | −3 | 3 | 1 | −1 | 3 | 3 | −3 | 1 | −1 | 1 | −1 | 1 |
| 26 | −1 | 1 | 3 | −3 | 1 | −1 | 1 | −1 | −1 | −3 | 1 | −1 |
| 27 | −3 | −3 | 3 | 3 | 3 | −3 | −1 | 1 | −3 | 3 | 1 | −3 |
| 28 | 1 | −1 | 3 | 1 | 1 | −1 | −1 | −1 | 1 | 3 | −3 | 1 |
| 29 | −3 | 3 | −3 | 3 | −3 | −3 | 3 | −1 | −1 | 1 | 3 | −3 |

The single PSFCH format may transmit the HARQ-ACK information based on the ZC sequence. Here, the ZC sequence for HARQ-ACK information may be generated by determining sequence group u and sequence number v in the group. Then, a cyclic shift (CS) value is determined and a final ZC sequence for HARQ-ACK information is generated.

For example, a case in which the ZC sequence has 30 base sequences may be considered. Therefore, to generate a single base sequence, a sequence group u number to be selected needs to be determined and a detailed method may be the same as the following Equation 6.

$$\alpha_l = \frac{2\pi}{N_{sc}^{RB}}\left(\left(m_0 + m_{cs} + m_{int} + n_{cs}\left(n_{s,f}^{\mu}, l + l'\right)\right) \bmod N_{sc}^{RB}\right) \quad \text{[Equation 6]}$$

In Equation 6, $n_{s,f}^{\mu}$ denotes a slot number within a radio frame and $r_{u,v}^{(\alpha,\beta)}(n)$ may be determined based on a parameter value of Equation 6. In detail, $m_{cs}$ may be differently configured according to a sidelink HARQ feedback transmission option based on the following Table 9 and Table 10. That is, different CS values may be allocated based on different HARQ-ACK. $m_0$ may be determined based on Table 11. In Table 11, $N_{CS}^{PSFCH}$ denotes the number of different CS values on a single PSFCH resource. Here, as a value of $N_{CS}^{PSFCH}$ increases, it represents that the number of PSFCH resources multiplexed on the same resource increases. l denotes an OFDM symbol index within PSFCH transmission. l=0 corresponds to a first OFDM symbol within the PSFCH transmission. l' denotes an OFDM symbol index within a slot and corresponds to a first OFDM symbol of PSFCH transmission within the slot. u=$n_{ID}$ mod 3 and v=0. Here, when $n_{ID}$ is configured through an upper layer, $n_{ID}$ is determined based on upper layer parameter "sl-PSFCH-HopID". On the contrary, when $n_{ID}$ is not configured through the upper layer, $n_{ID}$=0. Here, $c_{init}$ is $n_{ID}$. Therefore, when $n_{ID}$ is configured through the upper layer, $c_{init}$ is determined based on the upper layer parameter "sl-PSFCH-HopID". On the contrary, when $n_{ID}$ is not configured through the upper layer, $c_{init}$=0. Also, m=0. As a detailed example, in the case of an ACK/NACK-based PSFCH transmission option, HARQ-ACK information ($m_{cs}$) mapped from a CS pair may be the same as in the following Table 9. That is, HARQ-ACK information may be transmitted to a different sequence according to a CS value as shown in the following Table 9.

TABLE 9

| HARQ-ACK Value | 0 (NACK) | 1 (ACK) |
| --- | --- | --- |
| Sequence cyclic shift | 0 | 6 |

Also, for example, in the case of a PSFCH transmission option of feedback that transmits only a negative response (e.g., groupcast option 1), HARQ-ACK information ($m_{cs}$) mapped from the CS pair may be the same as in the following Table 10. That is, a CS value may be set only for the negative response (NACK) in the HARQ-ACK information and a CS value may not be set for ACK that is not transmitted.

TABLE 10

| HARQ-ACK Value | 0 (NACK) | 1 (ACK) |
| --- | --- | --- |
| Sequence cyclic shift | 0 | N/A |

Also, a set ($m_0$) of CS pairs may be the same as in the following Table 11. Here, $N_{CS}^{PSFCH}$ denotes the number of different cyclic shift (CS) values on a single PSFCH resource. As described above, as a value of $N_{CS}^{PSFCH}$ increases, the number of PSFCH resources multiplexed on the same resource may increase.

TABLE 11

| | $m_0$ | | | | | |
| --- | --- | --- | --- | --- | --- | --- |
| $N_{CS}^{PSFCH}$ | Cyclic Shift Pair Index 0 | Cyclic Shift Pair Index 1 | Cyclic Shift Pair Index 2 | Cyclic Shift Pair Index 3 | Cyclic Shift Pair Index 4 | Cyclic Shift Pair Index 5 |
| 1 | 0 | — | — | — | — | — |
| 2 | 0 | 3 | — | — | — | — |
| 3 | 0 | 2 | 4 | — | — | — |
| 6 | 0 | 1 | 2 | 3 | 4 | 5 |

In the following, a new NR sidelink resource allocation operation method that considers requirements for various services using a device-to-device (D2D) sidelink, such as a V2X service, a public safety, a wearable, and an augmented reality/virtual reality (AR/VR) service is described. The NR sidelink may be applied for the aforementioned additional various service cases as well as the service based on Table 5. An NR sidelink frequency for NR sidelink operation may be present within FR1 (410 MHz-7.125 GHz) and FR2 (24.25 GHz~52.6 GHz). Also, the NR sidelink frequency for NR sidelink operation may be present within frequency unlicensed ITS bands and licensed bands ITS. Therefore, the NR sidelink may be configured in consideration of applicability in various frequency bands. Also, the NR sidelink may operate using an Uu link that is a wireless access interface between a base station and a UE. In particular, when the UE is connected within base station coverage, configuration related to sidelink data transmission and reception and sidelink physical resource allocation may be configured by the base station through the Uu link. Therefore, an NR V2X sidelink transmission and reception procedure needs to be configured in consideration of Uu link of LTE (ng-eNB)/NR (gNB) that is 3GPP NG-RAN. Although the term "base station" is used in the following for clarity of description, the base station may be ng-eNB or gNB in the NG-RAN. The present disclosure is not limited to the aforementioned embodiment.

Regarding an NR sidelink operation, a mode 2 resource allocation method may be a resource allocation mode in which a Tx UE senses and selects a resource (on the contrary, as described above, mode 1 is a mode in which the base station indicates a resource for NR sidelink transmission and reception), which is described above. That is, the Tx UE may directly configure a resource for the NR sidelink without scheduling from the base station. The mode 2 resource allocation method may have low reception reliability (e.g., packet reception rate (PRR), packet inter-reception (PIR)) compared to the mode 1 method in which a sidelink resource is allocated and controlled by the base station.

Here, since the Tx UE directly senses and selects a sidelink resource, the Tx UE that operates in mode 2 may not recognize a hidden node UE and accordingly, may have low reliability compared to a case in which an NR sidelink resource is selected by the base station. Also, since the Tx UE directly senses and selects the resource, the Tx UE may not recognize collision/interference compared to a case in which scheduling is performed by the base station. Also, when the Tx UE operates based on a half-duplex method, the Tx UE may not avoid a situation in which transmission and reception collide and may have low reliability accordingly. In providing various services through NR sidelink, requirements for service provision need to be satisfied. A new resource allocation method is required to enhance reception reliability and transmission and reception delay of mode 2 operation.

Figure 6:
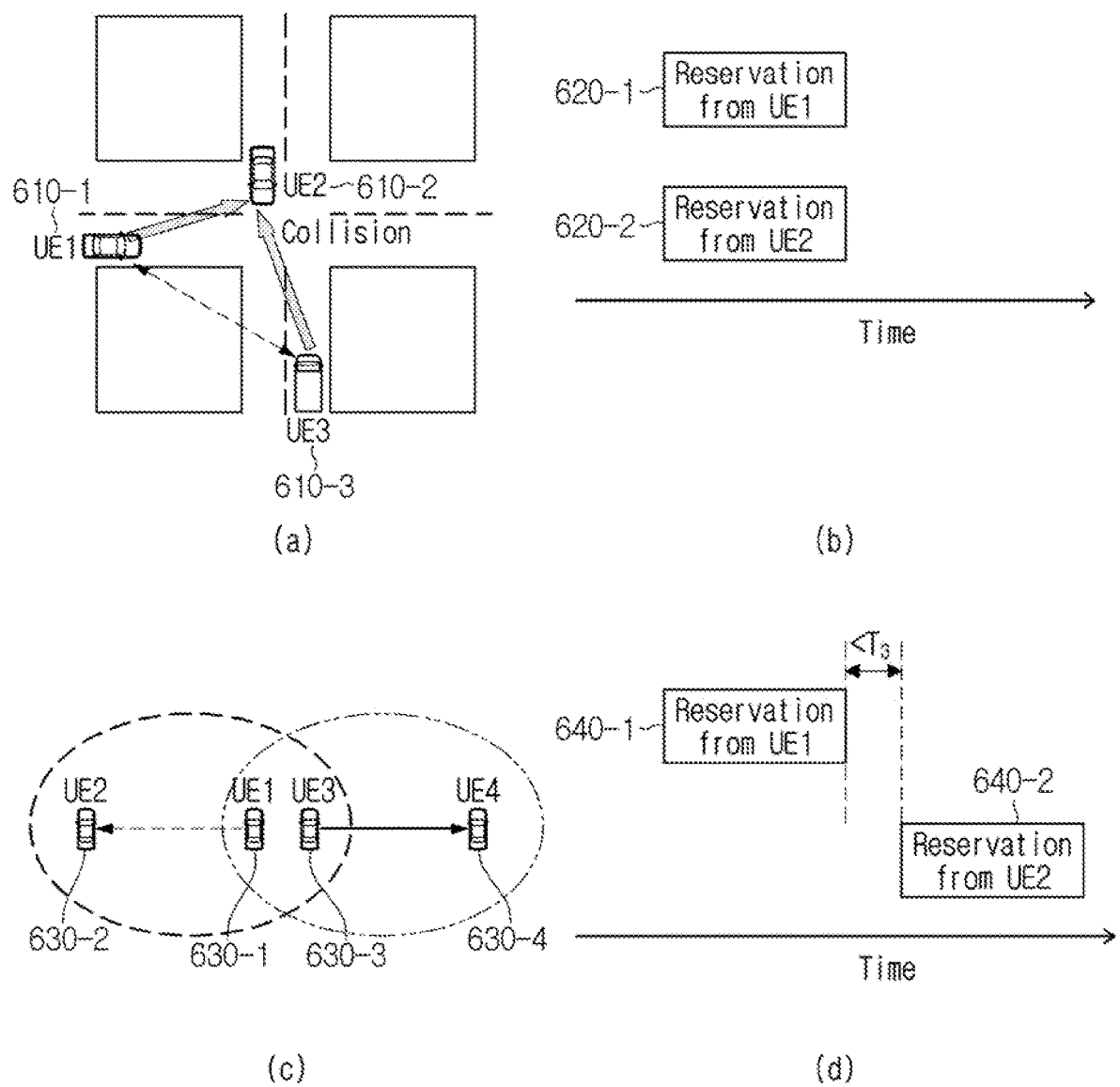
FIG. 6 illustrates an issue that occurs in a mode 2 resource allocation method to which the present disclosure may apply.

FIG. 6 illustrates an issue that occurs in a mode 2 resource allocation method to which the present disclosure may apply.

The mode 2 resource allocation method refers to a method in which a Tx UE performs resource sensing and then directly selects and transmits a resource. Regarding an issue of decreasing reliability of the mode 2 resource allocation method, (a) of FIG. 6 illustrates an issue caused by a hidden node UE. In detail, although collision for transmission between Tx UEs (UE1 610-1 and UE3 610-3) may not be mutually sensed, it may affect an Rx UE (UE2 610-2). That is, since the Tx UEs (UE1 610-1 and UE3 610-3) may not recognize each other, they may be hidden node UEs with respect to each other. In the above situation, when a Tx UE performs initial transmission in which reservation may not be performed, a resource collision may occur. Also, although a Tx UE is on a previously reserved resource, the Tx UE may not recognize another UE similar to a case in which $1^{st}$ SCI reception of another UE fails. In this case, a transmission resource collision may occur.

As another example, when the Tx UEs (UE1 610-1 and UE3 610-3) simultaneously select the same resource or when a single Tx UE performs resource reservation and then there is no enough time for another Tx UE to verify reservation information, the Tx UEs (UE1 610-1 and UE3 610-3) may not readily recognize each other and a resource collision may occur accordingly. For example, when a Tx UE performs aperiodic transmission or performs fast transmission based on short packet delay budget (PDB), time may be insufficient for the Tx UE to verify reservation information of another Tx UE.

Referring to (b) of FIG. 6, a resource collision may occur based on a half-duplex communication method. In the case of performing communication based on the half-duplex communication method, a Tx UE may not receive a signal in a slot of transmitting a signal. The Tx UE may receive SCI from neighboring UEs and may prevent a collision between a transmission resource and a reception resource using resource reservation information of the SCI. Here, since the Tx UE may not use resource reservation information of SCI that is not received from a neighboring UE, a resource use efficiency issue may occur. That is, the Tx UE may more reserve unnecessary resources or may not perform more retransmissions. Therefore, there may be a need for a time division multiplexing (TDM)-based D2D transmission and reception operation that may decrease effect of mutual interference. To this end, coordination information may be required. In detail, in (b) of FIG. 6, in a case in which a reserved resource 620-1 of UE1 and a reserved resource 620-2 of UE2 are configured in the same slot, if UE1 and UE2 are UEs that may affect interference mutually, resources need to be differently allocated based on TDM to prevent a resource collision.

Referring to (c) of FIG. 6, resource efficiency may be degraded due to an exposed node. A situation in which UE1 630-1 transmits data to UE2 630-2 and UE3 630-3 transmits data to UE4 630-4 may be considered. Here, the UE1 630-1 and the UE3 630-3 are located adjacently, but transmit data to different UEs. Since the UE1 630-1 is adjacent to the UE3 630-3, the UE1 630-1 may exclude a resource of the UE3 630-3 from its resource selection. Here, although the excluded resource is used, a great interference issue does not occur. That is, the UE1 630-1 may unnecessarily exclude a resource in which a collision does not occur. Although the UE3 630-3 performs data transmission in a resource excluded by the UE2 630-2, an interference issue does not occur in terms of a location. Therefore, reliability and efficiency of a transmission resource may be enhanced. Here, the existing mode 2 resource allocation method does not consider the above situation and thus, needs to consider the above situation.

Referring to (d) of FIG. 6, when UEs acquire similar sensing results at adjacent points in time, a resource collision/interference issue may occur. Here, if time is short to recognize sensing results based on at least one of an SCI decoding error, a lack of random selection resources within a resource selection procedure, and an RSRP measurement error, a collision may occur. In detail, when a reserved resource 640-1 of UE1 and a reserved resource 640-2 of UE2 are allocated at adjacent points in time, allocated resources may not be recognized according to the operation and resource exclusion may not be performed, and a collision may occur accordingly.

An inter-UE coordination technique may need to be considered in consideration of the above issue. That is, a Tx UE may receive resource-related information from a coordination UE (C-UE) and may select a resource. In the following, a detailed method is described. Also, in the following, the inter-UE coordination technique is referred to as a resource coordination procedure. That is, a procedure in which the Tx UE receives resource-related information from the C-UE and selects a resource may be a resource coordination procedure. However, it is a name only for clarity of description, and the present disclosure is not limited thereto.

In the mode 2 resource allocation method of sensing, by the Tx UE, and directly selecting a resource as in FIG. 6, reliability may be low due to the resource collision issue. Therefore, a method for solving a resource collision issue of the mode 2 resource allocation method may be required. In detail, the resource collision issue may be prevented based on a non-hierarchical mutual UE coordination method and a hierarchical mutual UE coordination method. Here, the hierarchical mutual UE coordination method may refer to a method of performing, by a mode 2 Tx UE, sidelink transmission on a resource provided without a resource sensing and resource selection procedure based on resource allocation information indicated by a specific UE (e.g., coordinating UE or road side unit (RSU)). That is, a method of scheduling, by the C-UE, a resource of the Tx UE may be the hierarchical mutual UE coordination method.

The non-hierarchical mutual UE coordination method may refer to a method of providing only information helpful to D2D resource allocation and not providing scheduling information related to a direct resource allocation. That is, the hierarchical mutual UE coordination method and the non-hierarchical UE coordination method may be distinguished depending on whether the C-UE directly performs sidelink resource scheduling on a mode 2 Tx UE. Here, the hierarchical mutual UE coordination method and the non-hierarchical UE coordination method are provided as examples only and may be named differently.

In the following, a resource allocation method of a mode 2 UE is described based on the non-hierarchical UE coordination method. That is, a Tx UE may perform sidelink transmission by receiving information related to resource allocation from a C-UE and by selecting a resource based on the received information. For example, the following new resource allocation method for the mode 2 UE may be applied based on any one or at least one of unicast, groupcast, and broadcast as a specific cast type. For example, a new mode 2 Tx UE that needs to select a resource for a unicast transmission packet may receive in advance information that may be helpful for a resource selection from an Rx UE that is a unicast pair UE and then may perform the resource selection for transmission of the unicast transmission packet. Additionally, a new mode 2 Tx UE having a groupcast transmission packet may acquire resource coordination information for the corresponding groupcast transmission from a specific UE (e.g., a UE having a specific member ID) within the corresponding group.

As another example, the following resource allocation method of the mode 2 UE may apply to all the cast types regardless of a cast type and is not limited to the aforementioned embodiment.

Therefore, at least one of or more combinations of the following methods may be selectively or equally applied according to a cast type that is considered between UEs that perform a mutual UE coordination method.

In the following, an operation of a UE having capability of performing an operation related to coordination information request and coordination information transmission is described. That is, a sidelink UE may determine whether a specific UE may perform a proposed operation according to UE capability. Also, a UE having the capability may perform the aforementioned operation based on at least one or a combination of an additional execution condition (or configuration) and signaling.

In detail, when a resource of the mode 2 UE is allocated based on the non-hierarchical mutual UE coordination method, a non-hierarchical mutual UE coordination request may be triggered. Regarding a situation in which the non-hierarchical mutual UE coordination method is required, a C-UE needs to recognize a situation in which resource selection of the mode 2 Tx UE (hereinafter, Tx UE) is required. That is, the Tx UE or the C-UE may recognize a point in time at which the new resource allocation method applies and a corresponding situation and may trigger a non-hierarchical mutual UE coordination procedure. For example, when signaling or a specific condition is satisfied, the non-hierarchical mutual UE coordination procedure may be performed by the Tx UE or the C-UE. Here, the C-UE may be an Rx UE or a unit (e.g., RSU) capable of performing sidelink transmission and reception. As another example, the C-UE may be another UE adjacent to the Tx UE or unit capable of performing sidelink transmission and reception. The C-UE may be a UE for cooperating resource allocation of the Tx UE and is not limited to a specific type UE. For example, at least one of the Tx UE, the Rx UE, the C-UE, and the base station may be present in consideration of a mutual C-UE.

Figure 7:
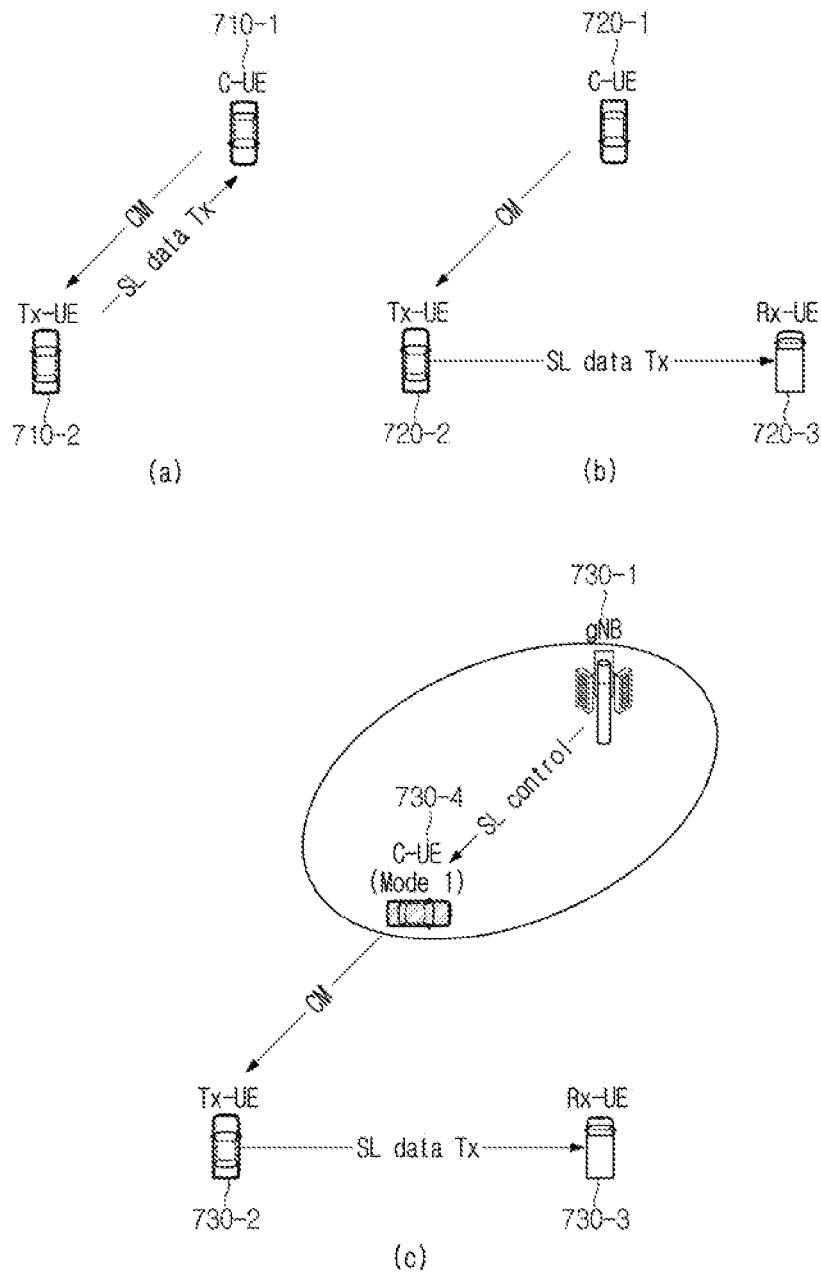
FIG. 7 illustrates a sidelink data transmission and reception scenario to which the present disclosure may apply.

FIG. 7 illustrates a sidelink data transmission and reception scenario to which the present disclosure may apply.

Referring to (a) of FIG. 7, an Rx UE 710-1 may be a C-UE. A Tx UE 710-2 may receive coordination message (CM) information from the C-UE 710-1. Here, the CM information may be information on a set of preferred resources or a set of nonpreferred resources of the C-UE 710-1 for data reception. For example, the C-UE 710-1 may receive SCI from neighboring Tx UEs and may generate information on a preferred resource set or a non-referred resource set based on verified information. Also, the C-UE 710-1 may generate information on the preferred resource set or the non-referred resource set based on another information and the present disclosure is not limited to the aforementioned embodiment.

Hereinafter, resource set information provided by a C-UE may include information resource preferred by a Tx UE or a resource that needs to be excluded, that is, nonpreferred by the Tx UE.

Referring to (b) of FIG. 7, a C-UE 720-1 may be a third UE. A Tx UE 720-2 receives CM information from the C-UE 720-1 to perform data transmission to an Rx UE 720-3. The Tx UE 720-2 may transmit sidelink data to the Rx UE 720-3 in a resource determined based on the CM information. As a detailed example, the C-UE 720-1 may provide resource set information (CM) to the Tx UE 720-2 in consideration of a situation in which a half-duplex issue or a consistent resource collision issue occurs between the Tx UE 720-2 and the Rx UE 720-3. The Tx UE 720-2 may transmit data to the Rx UE 720-3 by performing its resource selection procedure based on the received CM information.

Referring to (c) of FIG. 7, a C-UE 730-4 may be a UE that receives scheduling on resource allocation from a base station (e.g., LTE/NR base station) 730-1. That is, the C-UE 730-4 may be a mode 1 UE. A Tx UE 730-2 receives CM information from the C-UE 730-4 to perform data transmission to an Rx UE 730-3. The Tx UE 730-2 may transmit sidelink data to the Rx UE 730-3 in a resource determined based on the CM information. As a detailed example, the C-UE 730-4 may generate resource set information (CM) and may provide the same to the Tx UE 730-2 in consideration of a situation in which a half-duplex issue or a consistent resource collision issue occurs between the Tx UE 730-2 and the Rx UE 730-3. As another example, the C-UE 730-4 may generate coordination resource set information (CM) and may provide the same to the Tx UE 730-1 in consideration of scheduling resource information and/or resource pool allocated to generate resource coordination information from the base station 730-1, and resource configurations for avoiding a resource collision between in-coverage UE (mode1) and mode 2 UE, a hidden node issue, and a half-duplex issue. However, it is provided as an example only and the present disclosure is not limited to the aforementioned embodiment. The Tx UE 730-2 may perform data transmission to the Rx UE 730-3 by performing its resource selection procedure based on the received CM information.

Also, for example, in FIG. 7, a C-UE may be a mode 1 UE or a mode 2 UE. That is, the C-UE may be the mode 1 UE that receives resource scheduling by a base station or the mode 2 UE that directly senses and selects a resource. On the contrary, a Tx UE may be the above mode 2 UE. As described above, the D2D coordination resource procedure may need to be performed such that the Tx UE may receive CM information from the C-UE. To this end, the D2D coordination resource procedure needs to be triggered and a method of triggering a D2D coordination resource procedure is described in the following.

The D2D coordination resource allocation procedure may be performed based on explicit signaling. As another example, D2D coordination resource allocation may be performed depending on whether a specific condition and configuration are satisfied.

When the D2D coordination resource allocation procedure is explicitly performed, the Tx UE may transmit explicit signaling. The Tx UE may be the mode 2 Tx UE that senses and directly selects a resource or the mode 1 Tx UE that receives resource scheduling from the base station. That is, the mode 2 Tx UE or the mode 1 Tx UE may transmit explicit signaling for the D2D coordination resource allocation procedure. As another example, the base station may transmit explicit signaling for the D2D coordination resource allocation procedure. In the following, description is made based on the Tx UE for clarity of description. Here, the Tx UE may be the mode 2 Tx UE and the mode 1 Tx UE. Also, although the base station may perform the same operation as the following operation of the Tx UE, the following description is made based on the Tx UE for clarity of description.

Also, for example, explicit signaling for the coordination resource allocation procedure may be performed based on at least one of unicast transmission and groupcast transmission.

In detail, for example, for explicit signaling for the D2D coordination resource allocation procedure, a Medium Access Control (MAC)/Radio Resource Control (RRC) layer of a UE may request a physical (PHY) layer for coordination request (CR) transmission. The MAC/RRC layer of the UE may provide resource configuration information for the CR transmission to the PHY layer and, based thereon, may request the PHY layer for the CR transmission.

As another example, without a request from an upper layer, the PHY layer of the UE may perform the CR transmission based on configuration provided from the upper layer.

Figure 8:
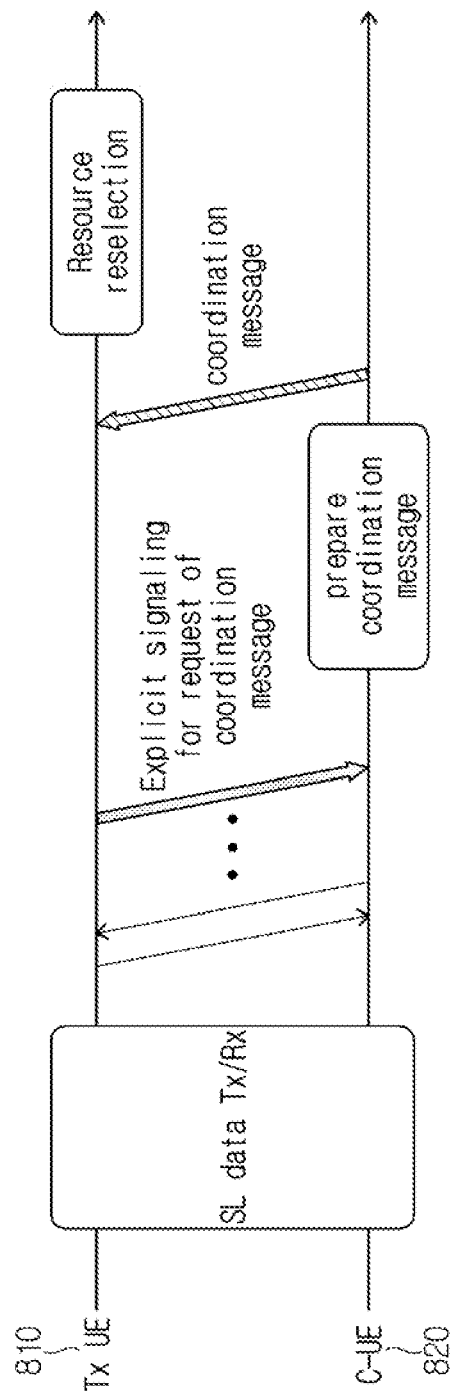
FIG. 8 illustrates a method of performing explicit signaling for a device-to-device (D2D) coordination resource allocation procedure to which the present disclosure may apply.

FIG. 8 illustrates a method of performing explicit signaling for a D2D coordination resource allocation procedure to which the present disclosure may apply.

Referring to FIG. 8, a Tx UE 810 and a C-UE 820 may perform an operation for sidelink communication. The Tx UE 810 may transmit explicit signaling for requesting the C-UE 820 for transmission of a coordination message required for resource selection. For example, the Tx UE 820 may transmit explicit signaling to the C-UE 820 for coordination message transmission at a point in time at which it is determined that a sidelink resource continuously collides or a resource selection is required. That is, the Tx UE 810 may request the coordination message transmission to the C-UE 820. When the C-UE 820 receives explicit signaling, the C-UE 820 may prepare a coordination message and may transmit the prepared coordination message to the Tx UE 810. The Tx UE 810 may perform a resource reselection procedure based on the coordination message received from the C-UE 820 and, through this, low latency requirements may be satisfied by preventing the above resource collision issue.

Here, when the C-UE 820 transmits the coordination message, the C-UE 820 may transmit the coordination message to the Tx UE 810 based on at least one of a periodic method, an aperiodic method, and a semi-persistent method. For example, a coordination message transmission method may be pre-configured or may be indicated through additional signaling and is not limited to the aforementioned embodiment.

In the following, a method of delivering, by a C-UE, a resource coordination request message from a Tx UE is described. Here, even a case of using a message transmission method (or a transmission format) based on the following resource coordination request message transmission method may also apply according to a format or a type of coordination information provided from the C-UE to the Tx UE.

For example, when the C-UE simply provides only coordination information (minimum information) on resource reselection or reevaluation to the Tx UE, a size of a coordination information message may be similar to that of a coordination resource request message. Therefore, a transmission method or a transmission format for transmitting the coordination resource request may also apply to coordination information transmission. Hereinafter, although description is made with the assumption of the transmission method or format for the coordination resource request for clarity of description, it may apply to coordination resource information according to a format or a type of coordination resource information.

When the Tx UE requests coordination message transmission through the explicit signaling, the Tx UE needs to determine a signaling format for transmitting corresponding triggering information to the C-UE.

Figure 9:
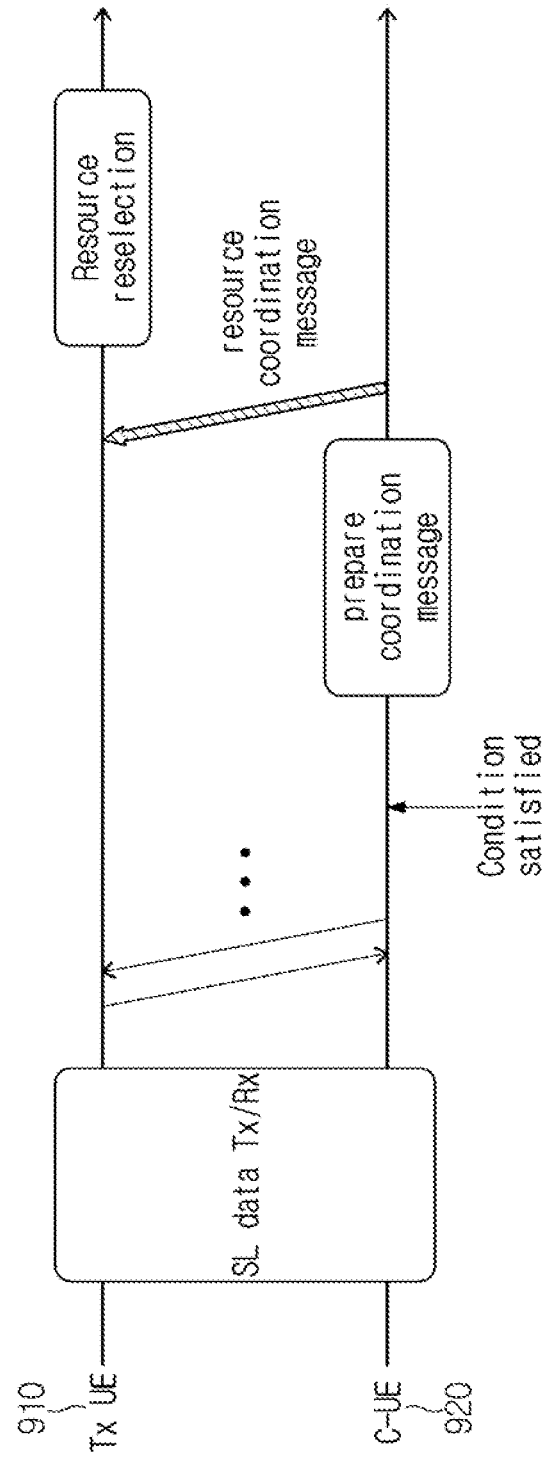
FIG. 9 illustrates a CR transmission resource that may be periodically/semi-persistently configured in a resource pool similar to a Physical Sidelink Feedback Channel (PSFCH) resource configuration.

For example, FIG. 9 illustrates a configuration of a dedicated coordination request resource to which the present disclosure may apply. Referring to FIG. 9, a Tx UE may transmit explicit signaling to a C-UE to request transmission of a coordination message. Here, explicit signaling transmitted from the Tx UE may be a resource coordination request (CR) message. The Tx UE may use a specific PSFCH resource (e.g., dedicated resource) as a signaling format for transmission of the resource coordination request message. Hereinafter, although a name of a channel of transmitting resource coordination request information is referred to as the existing PSFCH, it may be assumed that an independent channel different from the existing PSFCH of transmitting SL HARQ feedback information is defined for a resource coordination request. That is, defining an independent PHY channel for transmitting the resource coordination request information may be considered.

In detail, for example, when the Tx UE verifies a consistent collision occurrence probability or detects an occurrence of collision and when the Tx UE performs a (re) transmission resource selection, the Tx UE may need to transmit a resource coordination request message capable of minimizing the corresponding delay. That is, the resource coordination request message transmitted from the Tx UE may be for the (re)transmission resource selection. Considering this, the Tx UE may use the specific PSFCH resource for transmission of the resource coordination request message to assist (re)transmission resource selection in addition to HARQ feedback information.

As another example, when the Tx UE performs PSSCH transmission to an Rx UE, the Tx UE may transmit, to the Rx UE, resource coordination request information with PSSCH (sidelink data transmission). The Tx UE may transmit resource coordination request information to the Rx UE through a single field in SCI or a single field in $2^{nd}$ SCI within PSCCH. Also, the Tx UE may transmit resource coordination request information with the PSSCH based on one of the following methods.

As another example, when the Rx UE transmits, to the Tx UE, feedback information on the PSSCH transmitted from the Tx UE, the Rx UE may transmit resource coordination information for resource reselection with HARQ feedback information on a transport block (TB) included in the corresponding PSSCH. Here, the Rx UE may transmit resource coordination information to the Tx UE based on resource allocation and reservation information received from the Tx UE. That is, without a request from the Tx UE, the Rx UE may transmit resource coordination information for additional resource reselection to the Tx UE based on the resource allocation and reservation information received from the Tx UE. The Tx UE that receives such HARQ feedback information and resource coordination information from the Rx UE may modify the resource reservation and allocation information in SCI in which the corresponding TB is scheduled.

Here, since resource coordination request information transmits only information on a resource coordination request/resource reselection request status, the corresponding information may be represented as 1 bit (or on/off keying). That is, the information may be 1-bit information indicating two cases, a case in which the Tx UE requests the resource coordination to the C-UE and a case in which the Tx UE does not request the resource coordination to the C-UE.

As another example, in addition to the above 1-bit information on the resource coordination request status, the Tx UE may request the C-UE for more detailed resource coordination request information that the Tx UE desires to receive. For example, the Tx UE may request the C-UE for a resource coordination request and a type or a format of desired resource coordination information. Here, type/format information of resource coordination may include at least one of a preferred resource, a nonpreferred resource, and channel measurement information (e.g., RSRP, RSSI, CBR, CR). The Tx UE may request the C-UE for a type or a format of preferred resource coordination information in the above information. Here, when the Tx UE transmits only a resource coordination request, only 1-bit information may be required. However, when the Tx UE transmits a type or a format of desired resource coordination information with the resource coordination request, the Tx UE needs to use 1 bit or more additional information bits to transmit the type or the format of desired resource coordination information. In the following, transmission formats in which the Tx UE transmits a 1-bt resource coordination request or a resource coordination request and type or format information of desired resource coordination information using more bits than 1 bit are described.

Here, since a PSFCH resource area is applied to all UEs in which a corresponding pool is configured for each resource pool (i.e., resource pool specific), a resource selection procedure for PSFCH transmission only may not be performed in OFDM symbol(s) for PSFCH transmission in a single PSFCH transmission slot. Therefore, a format for transmitting the 1-bit resource coordination request information may be configured by modifying a PSFCH format defined for sidelink HARQ-ACK transmission or may be configured in a new format.

As another example, when the Tx UE transmits, to the C-UE, a resource coordination status and a type or a format of resource coordination information that the Tx UE desires to receive in the future, the Tx UE may transmit 1-bit or more bits of information. Here, the Tx UE may transmit resource coordination information through an additional CS value or additional PSFCH. In detail, for example, when a resource coordination request and resource coordination information include a total of 2 bits, the Tx UE may transmit the resource coordination request and the resource coordination information to the C-UE using additional CS or two PSFCHs.

As another example, when the Tx UE transmits, to the C-UE, a type or a format of resource coordination information that the Tx UE desires to receive from the C-UE in the future, the C-UE may determine that the Tx UE requests resource coordination. In detail, when the Tx UE transmits the type or the format of desired resource coordination information to the C-UE, the resource coordination request may also be necessary and the resource coordination request may be regarded to be performed without separate signaling. Through this, the Tx UE may use a corresponding information bit excluding a code point that does not require a coordination information request to transmit resource coordination information. That is, the resource coordination request may be performed through an operation of the Tx UE that transmits the type or the format of desired resource coordination information and an associated information bit may be allocated for the type or the format of desired resource coordination information, but the present disclosure is not limited to the aforementioned embodiment. The following coordination request (CR) may be considered to include not only the resource coordination request but also the type or the format of desired resource coordination information.

For example, in FIG. 9, a CR transmission resource may be periodically/semi-persistently configured within a resource pool, which is similar to PSFCH resource configuration. Alternatively, the CR information may be aperiodically transmitted to the C-UE at a timing desired by the Tx UE. Here, when the Tx UE aperiodically requests CR information to the C-UE, a separate triggering procedure for an aperiodic request may be required. In detail, for example, when the Tx UE is aware of a situation about resource collision or half-duplex communication issue based on a specific condition, the Tx UE may aperiodically transmit CR information to the C-UE. That is, the Tx UE may periodically/semi-persistently transmit the resource coordination request to the C-UE through the resource configured within the resource pool and, in the case of sensing the specific condition, may aperiodically transmit the resource coordination request to the C-UE. However, it is provided as an example only and the present disclosure is not limited to the aforementioned embodiment. The case of sensing the specific condition may be the same as the following triggering condition or configuration for transmission of coordination information by the C-UE.

Here, a CR transmission period value may be configured based on the number of slots or the number of OFDM symbols. The UE may transmit CR information to the C-UE through the configured resource. The C-UE may receive the CR information and then provide coordination resource information (i.e., CM) to the Tx UE. When the Tx UE periodically performs CR transmission, the Tx UE may share an independent CR transmission resource or ID value with the C-UE to identify a corresponding link per cast link (e.g., unicast #0~N, groupcast #0~N, broadcast).

For example, PSFCH resource allocation that includes sidelink HARQ-ACK information may verify an associated PSFCH transmission resource based on a subchannel index and a slot index used to transmit PSSCH. Here, a resource for CR transmission may use a format distinguished from a feedback resource allocation method related to PSSCH transmission that includes sidelink HARQ-ACK information. For example, the corresponding format may be a PSFCH format 1 resource. However, it is only a name for clarity of description and the present disclosure is not limited to the corresponding name.

Here, PSFCH format 1 may be configured based on the same sequence as the PSFCH format (i.e., PSFCH format 0) that includes sidelink HARQ-ACK information. Here, since information on CR transmission is included, a format distinguished from the PSFCH format that includes sidelink HARQ-ACK information may be used.

Figure 10:
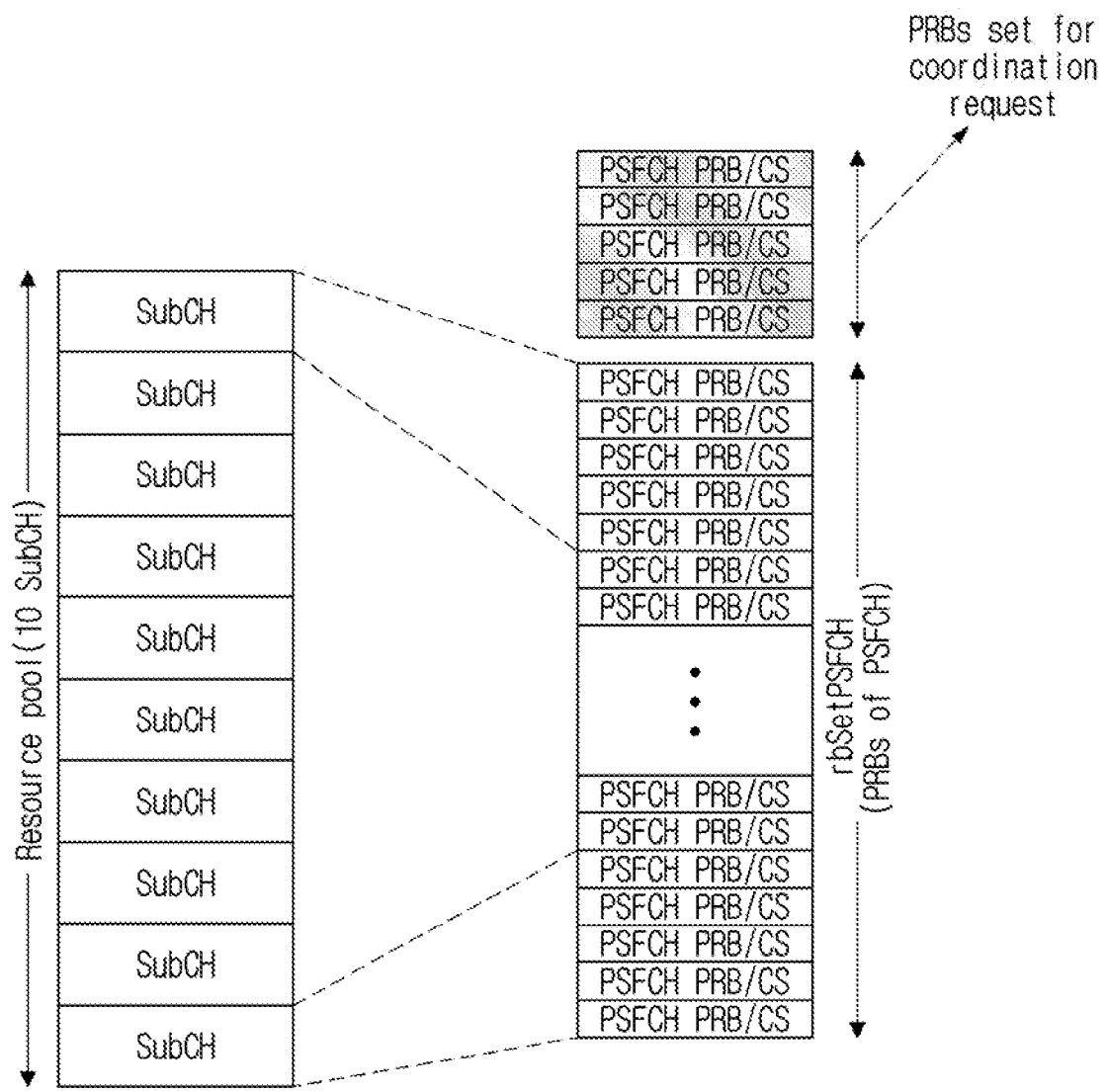
FIG. 10 illustrates a method of transmitting a coordination request based on a dedicated PSFCH format resource to which the present disclosure may apply.

FIG. 10 illustrates a method of transmitting a coordination request based on a dedicated PSFCH format resource to which the present disclosure may apply.

When a UE performs transmission for PSFCH that transmits sidelink HARQ-ACK information, the UE may configure a PSFCH physical resource block (PRB) set based on upper layer parameter "rbSetPSFCH". PSFCH that transmits sidelink HARQ-ACK information may be allocated to a specific slot based on a predetermined period. Also, associated subchannels may be present in a slot in which the PSFCH that transmits sidelink HARQ-ACK information is configured and a PSFCH physical resource block may be configured in a subchannel. Through this, sidelink HARQ-ACK information may be transmitted.

Here, a PSFCH PRB resource for PSFCH format 1 for the resource coordination request may be additionally configured based on the parameter "rbSetPSFCH".

For example, referring to FIG. 10, by additionally configuring a PRB set for coordination request (CR) (e.g., inter-UE coordination request), a resource for resource coordination request may be allocated without colliding with a PSFCH resource for HARQ feedback to PSSCH reception. That is, an independent PSFCH format 1 PRB/CS configuration may be provided for the explicit triggering signaling. For example, a PSFCH format 1 resource period may be indicated equally by parameter "periodPSFCHresource (1, 2, or 4)" indicating a period of PSFCH that transmits sidelink HARQ-ACK information or with other additional values. For the PSFCH format 1 resource period, a PSFCH resource period may be independently configured as a subset based on parameter "periodPSFCHresource (1, 2, or 4)" indicating a period of PSFCH that transmits sidelink HARQ-ACK information. Also, resource configuration may be independently configured for each resource pool or for each QoS and resource pool.

Also, resource allocation may be differently performed depending on whether CR transmission is performed standalone on a PSFCH format 1 PRB that is additionally configured for CR. For example, when CR transmission is performed standalone (standalone CR transmission), a resource indicating the CR transmission may indicate only 1-bit on/off information. That is, when transmission is performed on a dedicated allocation PSFCH resource for CR transmission and the UE acquires a request of CR information (positive CR), the UE may determine that the CR request is present. On the contrary, when the UE does not detect any signal on the corresponding resource, the UE may determine that the CR request is absent (negative CR).

As another example, an additional PSFCH resource configuration for CR may be required. That is, information on a CR request status may be mapped to a specific value and transmitted, similar to sidelink HARQ ACK/NACK.

For example, the following Table 12 may show a case in which a CR request status corresponding to 1 bit is mapped based on a CS value. Here, if the CR request is absent, the CS value may be set to 0 and if the CR request is present, the CS value may be set to 6.

TABLE 12

| CR value | No(0) | Yes(1) |
| --- | --- | --- |
| Sequence cyclic shift | 0 | 6 |

Here, when the Tx UE transmits CR information greater than 1 bit, the Tx UE may transmit the CR information through at least one of an additional CS/PRB value and/or an additional PSFCH format resource (e.g., simultaneous PSFCH transmissions). That is, when the Tx UE transmits resource coordination information to the C-UE with a resource coordination request status, the Tx UE may transmit CR information greater than 1 bit and, to this end, may use at least one of an additional CS/PRB value and/or an additional PSFCH format resource. For example, the following Table 13 may show a case in which the Tx UE transmits 2-bit CR information. Here, the CR information refers to 2-bit CR information for requesting at least one of a recommended resource set and channel information that the Tx UE desires to receive from the C-UE and each piece of information may be mapped to a CS value.

As another example, the Tx UE may use even information on a set of nonpreferred resources (i.e., a set of resources to be excluded) as a format for CR transmission through additional different CS values and additional PSFCH resources.

Also, the Tx UE may request a type or a format of preferred resource coordination information (i.e., CM) in addition to a CR status in CR information. For example, Table 13 may be used to request the C-UE using at least one of a set of resources recommended as preferred resource coordination information, a set of resources not-recommended (desired to be excluded), and channel measurement information (RSRP, CBR, or channel occupancy ratio) as a CR transmission resource.

TABLE 13

| Recommended resource set and channel measurement | {0, 0} | {0, 1} | {1, 0} | {1, 1} |
|---|---|---|---|---|
| Sequence cyclic shift | 0 | 3 | 6 | 9 |

As another example, when the C-UE receives sidelink data from the Tx UE and reselection of a corresponding resource is required based on future resource reservation and allocation information on the corresponding sidelink data (e.g., when a consistent collision or a collision with another Tx UE is predicted), the C-UE may transmit, as a response, HARQ feedback transmission (if it is present) related to corresponding sidelink data transmission and signaling information indicating necessity of modification of scheduling information or resource reselection in an SCI format for the corresponding sidelink data transmission to the Tx UE based on a PSFCH channel. In this case, similar to the aforementioned embodiment, at least one of an additional CS/PRB value and/or an additional PSFCH format resource may be used.

As another example, a case in which sidelink HARQ ACK information and at least one of CR and CM are multiplexed may be considered. Here, the aforementioned CM may include only minimum information for resource coordination information (e.g., providing information on a resource reselection status by the C-UE).

In the case of multiplexing sidelink HARQ-ACK information in a CR (or CM) transmission slot (=PSFCH resource slot), positive CR (or CM) and sidelink HARQ-ACK information may be multiplexed on a PSFCH resource for CR information transmission.

For example, the number of resources of PSFCH format 1 within a single transmission slot for CR (or CM) transmission may be determined based on the following Equation 7.

$$R_{PRB,CS}^{PSFCH1} = M_{PRB}^{PSFCH1} \cdot N_{CS}^{PSFCH1}$$ [Equation 7]

In Equation 7, $R_{PRB,CS}^{PSFCH1}$ denotes the number of PSFCH format 1 resources configured for a resource coordination procedure request per single PSFCH format 1 occasion, and $M_{PRB}^{PSFCH1}$ denotes the number of PRBs of PSFCH format 1 configured by an upper layer for the resource coordination procedure request. $M_{PRB}^{PSFCH1}$ may be provided through upper layer signaling. $N_{CS}^{PSFCH1}$ denotes the number of CS pair indexes (CS-pair) for PSFCH format 1 transmission as shown in the following Table 14, and may be configured and provided in an upper layer. Here, a value of $m_0$ may be determined per CS pair index by combining the following Table 14 and a value of $N_{CS}^{PSFCH1}$ (upper layer configuration). As shown in Equation 6, $m_0$ may be a single value used to compute a CS value α. Indexing of PSFCH format 1 resources for CR transmission may be performed in ascending order from a PRB index within a physical resource block set of PSFCH format 1 configured for the purpose of CR and then CS values may be indexed.

TABLE 14

| | $m_0$ | | | | | |
|---|---|---|---|---|---|---|
| $N_{CS}^{PSFCH}$ | Cyclic Shift Pair Index 0 | Cyclic Shift Pair Index 1 | Cyclic Shift Pair Index 2 | Cyclic Shift Pair Index 3 | Cyclic Shift Pair Index 4 | Cyclic Shift Pair Index 5 |
| 1 | 0 | — | — | — | — | — |
| 2 | 0 | 3 | — | — | — | — |
| 3 | 0 | 2 | 4 | — | — | — |
| 6 | 0 | 1 | 2 | 3 | 4 | 5 |

Here, when the Tx UE transmits the triggering request information (CR or CM) through a PSFCH resource based on at least 1-bit information, the corresponding information may be distinguished based on CS mapping as in the following Table 16. As another example, when the Tx UE multiplexes and thereby transmits sidelink HARQ-ACK information and CR (CM) in the same PSFCH format 1 slot, it may be distinguished according to CS mapping corresponding to each bit combination as shown in the following Table 15.

Alternatively, in the case of performing sidelink HARQ-ACK transmission in a PSFCH format 1 resource for CR, the UE may simultaneously multiplex sidelink HARQ-ACK information bits using positive CR information and the following Table 16.

TABLE 15

| SL HARQ-ACK and CR (or CM) value | {0, 0} | {0, 1} | {1, 0} | {1, 1} |
|---|---|---|---|---|
| Sequence cyclic shift | 0 | 3 | 6 | 9 |

TABLE 16

| SL HARQ-ACK value | No(0) | Yes(1) |
|---|---|---|
| Sequence cyclic shift | 0 | 6 |

The UE that transmits CR information may need to determine a single PSFCH format 1 resource index among a total number of resources $R_{PRB,CS}^{PSFCH1}$ for transmitting a resource coordination procedure request (CR/CM). Here, the single resource may be determined according to the following Equation 8.

$$(P_{ID}+M_{ID}) \bmod R_{PRB,CS}^{PSFCH1} \qquad \text{[Equation 8]}$$

In Equation 8, $P_{ID}$ denotes a layer 1 (L1) source ID or a destination ID of the C-UE and/or the Tx UE or an ID value determined through combination thereof. Also, $M_{ID}$ denotes a member ID of the C-UE and/or the Tx UE when a different resource needs to be allocated for each member in the case of groupcast, and may be 0 when a different resource allocation for each member is not required.

Figure 11:
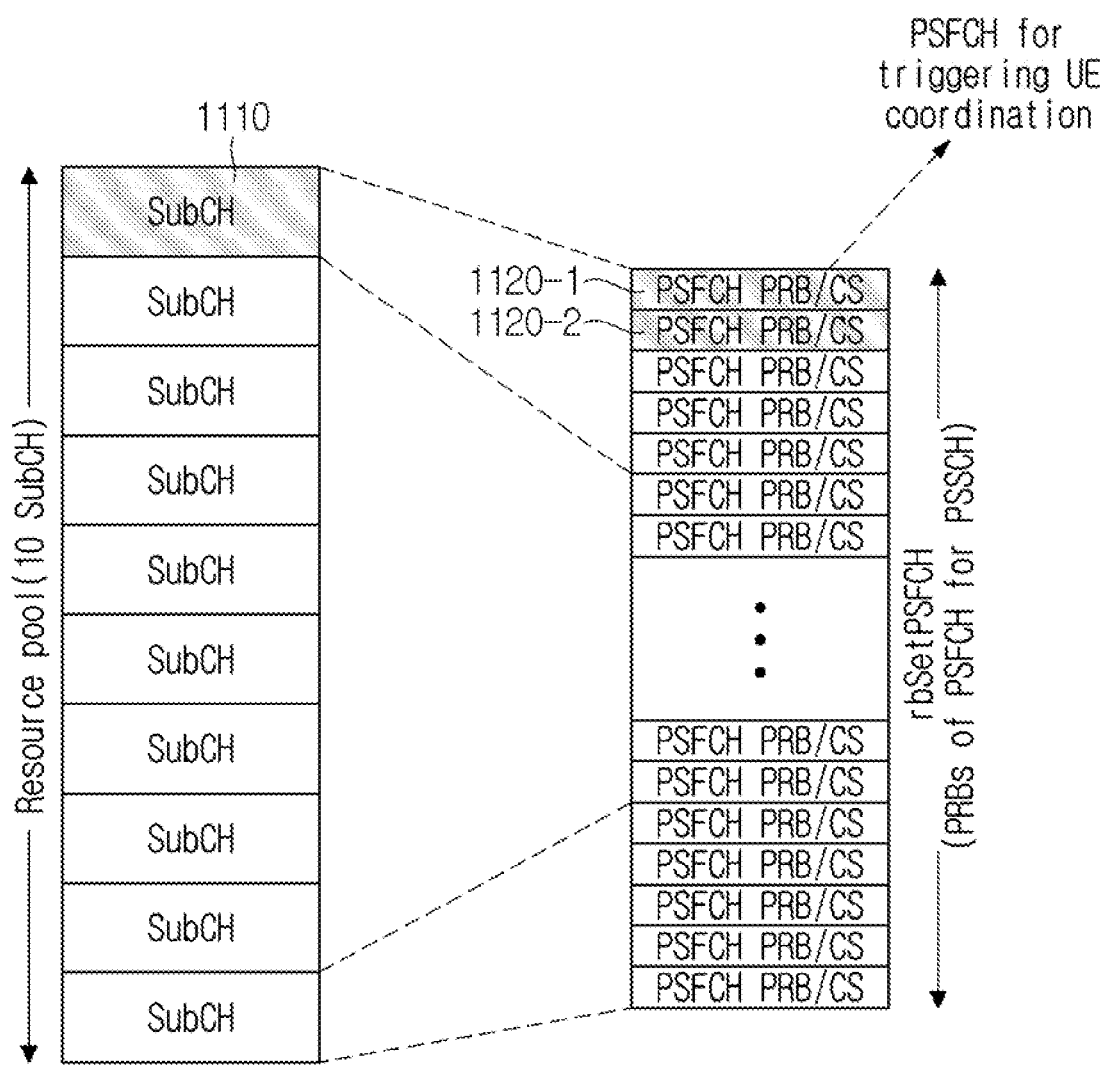
FIG. 11 illustrates a method of transmitting a coordination request based on a dedicated PSFCH format resource to which the present disclosure may apply.

FIG. 11 illustrates a method of transmitting a coordination request based on a dedicated PSFCH format resource to which the present disclosure may apply.

At least one of CS pair values and a specific PRB among PSFCH PRBs for sidelink HARQ feedback information may be used as a resource for CR transmission.

Referring to FIG. 11, a resource pool for PSFCH transmission may be configured in a UE. Here, PSFCH PRBs associated with one subchannel or a plurality of subchannels are present per specific slot(s) within an associated PSFCH PRB set for each of subchannels corresponding to the entire resource pool. A resource for CR transmission may be configured to use some PSFCH PRBs associated with one subchannel or the plurality of subchannels per specific slot(s) for the purpose of the CR transmission instead of using the same as a resource for sidelink HARQ feedback transmission. In detail, in FIG. 11, other subchannels within the resource pool may be used as a resource for sidelink HARQ feedback information transmission and a last subchannel 1110 may be used as a resource for the purpose of CR transmission. Here, some PRB/CS resources 1120-1 and 1120-2 among PSFCH PRB/CS resources corresponding to the last subchannel 1110 may be used as the resource for CR transmission. That is, when PSFCH resources are configured in the Tx UE, the Tx UE may use some PRB/CS resources among PSFCH PRB/CS resources for sidelink HARQ feedback and may use other some PRB/CS resources for CR transmission. For example, some PSFC PRB/CS resources among PSFCH PRB/CS resources corresponding to the last subchannel 1110 among the PSFCH PRB/CS resources may be used for CR transmission and other PRB/CS resources may be used as resources for sidelink HARQ feedback information transmission.

For example, the UE may configure PSFCH PRB resources ($M_{PRB,set}^{PSFCH}$ PRBs) in a single resource pool. The UE determines PSFCH PRBs associated with a single subchannel or a plurality of subchannels per slot through $[(i+j \cdot N_{PSSCH}^{PSFCH}) \cdot M_{subch,slot}^{PSFCH}(i+1+j \cdot N_{PSSCH}^{PSFCH}) \cdot M_{subch,slot}^{PSFCH}-1]$ PRBs within the configured resources. Also, the UE determines an associated PSFCH transmission PRB value ($M_{subch}^{PSFCH}$) for each subchannel and for each slot. The above $M_{subch,slot}^{PSFCH}$ is determined based on the following Equation 9.

$$M_{subch,slot}^{PSFCH}=M_{PRB,set}^{PSFCH}/(N_{subch} \cdot N_{PSSCH}^{PSFCH}), \; 0 \le i < N_{PSSCH}^{PSFCH}, \; 0 \le j < N_{subch} \qquad \text{[Equation 9]}$$

Here, in Equation 9, allocation order may index associated PSFCH PRBs for each subchannel for each slot in order In which associated slot index i initially increases and then associated subchannel index j increases. That is, a value of $M_{subch,slot}^{PSFCH}$ corresponds to the number of associated PSFCH PRBs for each index combination of i and j.

Here, specific slot index (i) and subchannel index (j) values may be set to allocate a dedicated PRB resource for PSFCH format 1 for CR transmission. That is, to transmit sidelink HARQ-ACK information, a portion of allocated PSFCH PRB resources may be used as PSFCH format 1 PRBs for CR transmission. To this end, specific slot index(es) and subchannel index(es) for CR transmission may be configured as resources in the UE through upper layer configuration. To this end, the UE may receive resource allocation through scheduling, and, in the case of configuring a resource for CR transmission, may avoid additional resource overhead and may maximally reuse a PSFCH format for sidelink HARQ feedback information. For example, a resource of PSFCH format 1 for CR transmission may be determined based on the following Equation 10.

$$R_{PRB,CS}^{PSFCH1}=M_{PRB}^{PSFCH1} \cdot N_{CS}^{PSFCH1} \qquad \text{[Equation 10]}$$

In Equation 10, $R_{PRB,CS}^{PSFCH1}$ denotes the number of PSFCH format 1 resources configured for a resource coordination procedure request (or inter-UE coordination) per single PSFCH occasion, and $M_{PRB}^{PSFCH1}$ denotes the number of PRBs of PSFCH format 1 associated with the configured specific slot/subchannel index. For example, in FIG. 10, $R_{PRB}^{PSFCH1}$ denotes the number of PRBs of PSFCH format 1 for the resource coordination procedure request (or inter-UE coordination) and may differ from $M_{PRB}^{PSFCH1}$ that is configured based on the specific slot/subchannel index configured in FIG. 11. $M_{PRB}^{PSFCH1}$ may be provided through upper layer signaling. $N_{CS}^{PSFCH1}$ denotes the number of CS pair indexes for PSFCH format 1 transmission as shown in the following Table 17 and may be configured and provided through an upper layer. Here, a value of $m_0$ may be determined for each CS pair index by combining the following Table 17 and a value of $N_{CS}^{PSFCH1}$ (upper layer configuration). As shown in the above Equation 6, $m_0$ may be a value used to compute a CS value α. Indexing of PSFCH format 1 resources for CR transmission may be performed in ascending order from a PRB index within a physical resource block set of PSFCH format 1 configured for the purpose of CR and then CS values may be indexed.

TABLE 17

| $N_{CS}^{PSFCH}$ | Cyclic Shift Pair Index 0 | Cyclic Shift Pair Index 1 | Cyclic Shift Pair Index 2 | Cyclic Shift Pair Index 3 | Cyclic Shift Pair Index 4 | Cyclic Shift Pair Index 5 |
|---|---|---|---|---|---|---|
| | | | | $m_0$ | | |
| 1 | 0 | — | — | — | — | — |
| 2 | 0 | 3 | — | — | — | — |
| 3 | 0 | 2 | 4 | — | — | — |
| 6 | 0 | 1 | 2 | 3 | 4 | 5 |

Here, when the Tx UE transmits the triggering request information through a PSFCH resource based on at least 1-bit information, the corresponding information may be distinguished based on CS mapping as shown in the following Table 18 and Table 19. As another example, when the Tx UE multiplexes and thereby transmits sidelink HARQ-ACK information and CR (CM) in the same PSFCH format 1 slot, it may be distinguished according to CS mapping as shown in the following Table 17.

Alternatively, in the case of performing sidelink HARQ-ACK transmission in a PSFCH format 1 resource for CR, the UE may verify sidelink HARQ-ACK information bits using positive CR information and the following Table 18.

TABLE 18

| SL HARQ-ACK and CR value | {0, 0} | {0, 1} | {1, 0} | {1, 1} |
|---|---|---|---|---|
| Sequence cyclic shift | 0 | 3 | 6 | 9 |

TABLE 19

| SL HARQ-ACK value | No(0) | Yes(1) |
|---|---|---|
| Sequence cyclic shift | 0 | 6 |

The UE that transmits CR information may need to determine a single PSFCH format 1 resource index among a total number of resources $R_{PRB,CS}^{PSFCH1}$ for transmitting a resource coordination procedure request (CR/CM). Here, a single resource may be determined according to the following Equation 11.

$$(P_{ID}+M_{ID}) \bmod R_{PRB,CS}^{PSFCH1} \quad \text{[Equation 11]}$$

Here, $P_{ID}$ denotes a layer 1 (L1) source ID or a destination ID of the C-UE and/or the Tx UE or an ID value determined through combination thereof. Also, $M_{ID}$ denotes a member ID of the C-UE and/or the Tx UE when a different resource needs to be allocated for each member in the case of groupcast, and may be 0 when a different resource allocation for each member is not required.

As another example, the UE may perform explicit signaling for a CR request by defining a new SCI format/field. Here, SCI format 1 and SCI format 2-A or 2-B may be used for sidelink control information. Here, when the new SCI format (e.g., SCI format 2-C or SCI format 1-B) for the new transmission resource allocation method is defined, CR and/or CM information may be included in the corresponding SCI format. For example, a SCI format name is not limited to a specific name.

Here, to transmit the new SCI format that considers the new transmission resource allocation method, PSCCH ($1^{st}$ SCI)/$2^{nd}$ SCI/PSSCH transmission may be accompanied. In detail, a mode 2 UE that senses and directly selects a resource may need to perform corresponding SCI format transmission using a resource acquired through a resource selection procedure for PSCCH and PSSCH transmission to transmit CR information to the inside of the SCI format.

Here, for example, to minimize a delay that occurs based on a sidelink data transmission resource selection procedure, the UE may perform SCI format and/or PSSCH transmission that includes CR information by configuring and using a resource through periodic or aperiodic resource reservation. As another example, the UE may additionally include CR information in standalone PSCCH, PSSCH, or $2^{nd}$ SCI format and thereby transmit the same. Here, a MAC/RRC layer of the UE may request a PHY layer for CR transmission. The MAC/RRC layer of the UE may provide resource configuration for CR transmission to the PHY layer and may request the CR transmission.

As another example, the PHY layer of the UE standalone may perform CR transmission without a request from an upper layer. Here, a method of determining a resource for SCI format or PSSCH transmission in which CR information is included may need to be configured. The SCI format/PSSCH transmission resource that includes CR information may use a resource within a candidate resource set that is determined through a resource sensing and resource selection procedure performed in the PHY layer. The UE may designate a specific resource within a set of candidate resources selected through the resource selection procedure as a resource for corresponding CR transmission. For example, the UE may select a single candidate resource from among temporally fastest resources within the selected set of candidate resources. Here, when the UE transmits CR information with other sidelink data transmission, the UE may transmit PSSCH ($1^{st}$ SCI format) that transmits control information of sidelink PSSCH data transmission on the resource acquired through the resource selection procedure to transmit a sidelink data TB or may transmit the CR information through the PSSCH. As another example, the UE may transmit CR information through the $2^{nd}$ SCI format that transmits control information of sidelink PSSCH data transmission on the resource acquired through the resource selection procedure to transmit the sidelink data TB. For example, the $2^{nd}$ SCI format that transmits CR information may be "$2^{nd}$ SCI format 2-C". However, it is provided as an example only and may not be limited to the following name. For clarity of description, the $2^{nd}$ SCI format that transmits CR information is referred to as $2^{nd}$ SCI format 2-C.

TABLE 20

| Value of 2-stage SCI format field | 2-stage SCI format |
|---|---|
| 00 | SCI format 2-A |
| 01 | SCI format 2-B |
| 10 | SCI format 2-C (proposed new format) |
| 11 | Reserved |

Here, the UE may determine a format to be use between SCI format 2-A and SCI format 2-B based on HARQ feedback option information and cast type information and may indicate the same through SCI format 1. SCI format 1 may include a $2^{nd}$ SCI format indicator field as shown in Table 20 and, through this, may indicate the $2^{nd}$ SCI format. Here, one reserved value in the $2^{nd}$ SCI format indicator field of SCI format 1 may be newly defined for the purpose of a D2D coordination transmission format, which may be the aforementioned SCI format 2-C. Therefore, SCI format 2-C that is a new SCI format for a resource coordination procedure may be indicated through SCI format 1. The UE that receives SCI format 2-C may verify SCI field information for the resource coordination procedure within SCI format 2-C and may operate based thereon. For example, a CR field value may be present in SCI format 2-C as shown in Table 21 and a coordination triggering status may be verified based on CR field value information. That is, the C-UE that receives SCI format 2-C may receive explicit signaling from the Tx UE.

TABLE 21

| Value of CR field | CR information |
|---|---|
| 0 | No-coordination |
| 1 | Triggering of coordination |

The Tx UE may transmit the above SCI format 2-C to the C-UE. Here, SCI format 2-C may further include information on the following Table 21 as well as CR information. The C-UE may configure a CM transmitted to the Tx UE based on information included in the following Table 21.

As another example, the Tx UE may additionally configure SCI format 1-B to $1^{st}$ SCI format 1-A that is transmitted through PSCCH. The Tx UE may include information on the following Table 22 in SCI format 1-B and may transmit the same, and through this, may provide information for a CM configuration to the C-UE.

In detail, the Tx UE may provide L1 priority information to the C-UE for the resource sensing and selection procedure for CM configuration. The C-UE may use the L1 priority information of the Tx UE to determine an RSRP threshold and may replace the same with a pi value and thereby apply. Also, the Tx UE may provide remaining PDB (or validity timer or T2) information to indicate a CM window termination point in time to the C-UE. Also, the Tx UE may provide slot information in which a CM window start point in time is considered to the C-UE. Also, the Tx UE may provide information on at least one of a source ID, a destination ID, the number of subchannels per slot, a resource reservation period, and zone ID information to the C-UE. Also, the Tx UE may provide information on a communication range value with zone ID information. Here, the C-UE may determine a CM reporting status in consideration with a distance from the Tx UE and may receive information for this from the Tx UE. Also, the Tx UE may provide RS type information for sensing to the C-UE. Through this, the C-UE may verify an RSRP used to perform sensing between a PSSCH RSRP and a PSCCH RSRP. Also, the Tx UE may compare L1 priority information in SCI received from UEs around the C-UE and may provide a "p-preemption" value that is available when selecting a resource. Here, information shown in the following Table 22 is provided as an example only and other information may be further included.

TABLE 22

| Inter-UE coordination request: |
|---|
| This field refers to a field that indicates a coordination request status. Inter-UE coordination is enabled by upper layer signaling such as PC5-RRC and is available for CR when the inter-UE coordination request field is set to a value of 1. |
| L1 priority: |
| Then, for a resource sensing/selection procedure for CM configuration, the C-UE may replace received L1 priority information of the Tx UE with a pi value and may apply the same when determining an RSRP threshold, (pi from Tx UE, pj from SCI of other UEs) |
| Remaining PDB (or validity timer or T2): |
| To indicate a CM window termination point in time. In particular, it may be provided for configuration in consideration of validity information of CM information. |
| T1 or T3 value (slot): |
| To indicate a CM window start point in time. Source ID: source ID of Tx UE Destination ID: destination ID of a reception side Number of subchannels for PSSCH/PSCCH within a single slot (i.e., L sub-CHs) Resource reservation period value: resource reservation period value X percentage (%): a ratio of resource candidate sets to total resources. To satisfy the ratio, the ratio is adjusted by changing an RSRP ratio. Zone ID: ID corresponding to a physical area in which a UE is present. |
| Communication range: |
| Dissimilar to communication range that is considered to determine whether to perform the existing SL HARQ-feedback transmission with the zone ID, a CM reporting status may be determined based on a communication range value. If a distance between the Tx UE and the C-UE is far, validity of CM information provided from the C-UE may be degraded. Therefore, the CM reporting status may be determined based on communication range information and a corresponding threshold. |
| RS type for sensing: |
| Information on an RSRP value used for the C-UE to perform sensing between PSSCH-RSRP and PSCCH-RSRP may be provided. |
| p-preemption: |
| The C-UE may receive a p-preemption value that is available when selecting a resource through comparison of Li priority information in SCI received from neighboring UEs. |

As another example, some bits (e.g., 1 bit) within a reserved field within SCI format 1-A may be used for the purpose of triggering. That is, some bits (e.g., 1 bit) within the reserved field may be used as a field for verifying a CR transmission status. For example, the reserved bit may be configured by upper layer parameter "sl-NumReservedBits". Here, although some bits (e.g., 1 bit) within the reserved field may be defined as "inter-UE coordination triggering field", it is provided as an example only and is not limited to a corresponding name. That is, CR information may be indicated through a bit newly added to the existing SCI format.

As another example, CR information may be indicated based on CRC scrambling. In detail, a CRC bit on PSSCH/PSCCH/PSBCH transmitted from the Tx UE may be masked (or scrambled) as the triggering (CR) information and thereby transmitted to the UE.

Here, additional information may be scrambled to a CRC bit for verifying an error check at the end of a payload of each channel. That is, CRC is attached at a rear of a data payload and generally transmitted. Here, CRC information bits to be attached may be scrambled with RNTI $x_{rnti,0}, x_{rnti,1}, \ldots, x_{rnti,15}$ and CR information bits $(y_{cr,0}, y_{cr,1}, \ldots, y_{cr,15})$ as below. If an RNTI value does not need to be used, scrambling is performed using CR information bits $(y_{cr,0}, y_{cr,1}, \ldots, y_{cr,15})$ only. Here, $b_k$ denotes a bitstream that includes a data payload and CRC parity bits. Relationship between $b_k$ and $c_k$ may be represented as the following Equation 12 and Equation 13.

$$c_k = b_k \text{ for } k=0,1,2,\ldots,A+7 \qquad \text{[Equation 12]}$$

$$c_k = (b_k + x_{rnti,k-A-8} + y_{cr,k-A-8}) \bmod 2 \text{ for } k=A+8, A+9, A+10, \ldots, A+23. \qquad \text{[Equation 13]}$$

As another example, the Tx UE may generate a sequence by additionally using the triggering (CR) information as an input value of DMRS sequence initialization and may provide the signaling. Here, sequence $r_l(m)$ may be generated as an initialization value for DMRS sequence generation based on Equation 14.

$$r_l(m) = \frac{1}{\sqrt{2}}(1-2c(2m)) + j\frac{1}{\sqrt{2}}(1-2c(2m+1)) \qquad \text{[Equation 14]}$$

Also, pseudo-random sequence c(m) for DMRS sequence generation may be generated based on the following Equation 15. In Equation 15, l denotes an OFDM symbol within a slot, $n_{s,f}^\mu$ denotes a slot number within a frame, and $N_{ID}$ is provided by upper layer parameter "sl-DMRS-ScrambleID" and may be $N_{ID} \in \{0, 1, \ldots, 65535\}$. For example, if CR is triggered in the following Equation 15, $N_{CR}=1$. On the contrary, if CR is not triggered, $N_{CR}=0$ and, through this, a CR triggering status may be indicated.

$$c_{init}=(2^{17}(N_{symb}^{slot} n_{s,f}^\mu + l + 1)(2N_{ID}+1)+2N_{ID}+N_{CR}) \bmod 2^{31} \qquad \text{[Equation 15]}$$

As another example, the C-UE may transmit CR-related information to the Tx UE through upper layer signaling different from other signaling options, and the present disclosure is not limited to the aforementioned embodiment.

The Tx UE may transmit the CR information to the C-UE and may explicitly signal a resource coordination procedure request to the C-UE.

Explicit signaling of the Tx UE provided for the resource coordination procedure request is discussed above and the C-UE that receives the corresponding explicit resource coordination procedure request may generate information for resource coordination and may transmit the generated information to the Tx UE.

As another example, when a specific condition or a specific configuration is satisfied without explicit signaling of the Tx UE, the C-UE may perform the resource coordination procedure. Hereinafter, the specific condition or the specific configuration for the C-UE to perform the resource coordination procedure is described.

Figure 12:
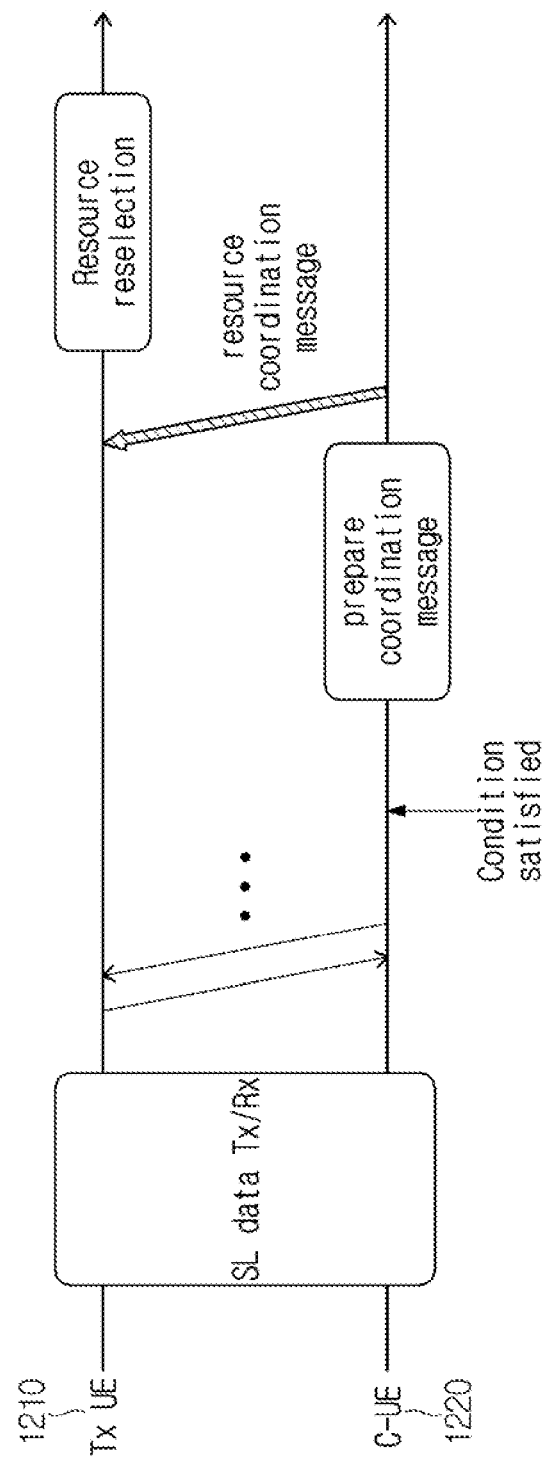
FIG. 12 illustrates a condition-based resource coordination procedure performing method to which the present disclosure may apply.

FIG. 12 illustrates a condition-based resource coordination procedure performing method to which the present disclosure may apply.

Referring to FIG. 12, a Tx UE 1210 and a C-UE 1220 may operate based on sidelink communication.

Here, the C-UE 1220 may sense conditions that occur based on at least one of the aforementioned hidden node issue, half-duplex communication issue, and resource collision issue. When the C-UE 1220 senses a case that the proposed condition/configuration is satisfied, the C-UE 1220 may generate CM information and may transmit the CM information to the Tx UE 1210. The Tx UE 1210 may perform resource reselection based on the CM information. That is, when the specific condition is satisfied even without explicit signaling for a resource coordination procedure request from the Tx UE 1210, the C-UE 1220 may generate CM information and may transmit the CM information to the Tx UE 1210. Here, the specific condition/configuration may be configured based on at least one of continuous collision detection, poor channel environment detection, and high CBR measurement and may be configured in other forms.

When the C-UE 1220 transmits the CM information to the Tx UE 1210, the C-UE 1220 may transmit the CM information to the Tx UE 1210 based on at least one of a periodic method, an aperiodic method, and a semi-persistent method.

In detail, for example, a triggering condition (or configuration condition) for the C-UE 1220 to generate and transmit CM information may be configured in consideration of each situation. Regarding the hidden node issue, when a resource collision is predicted or when a collision occurs as a result of verifying, by the C-UE 1220, an SCI format received from neighboring Tx UE(s), it may be determined that the triggering condition is satisfied. That is, when the C-UE verifies resource reservation information and resource allocation information in the SCI format received from the neighboring Tx UEs and a resource collision between different Tx UEs is verified, the C-UE may generate and transmit CM information that includes information on the corresponding colliding resource.

Figure 13:
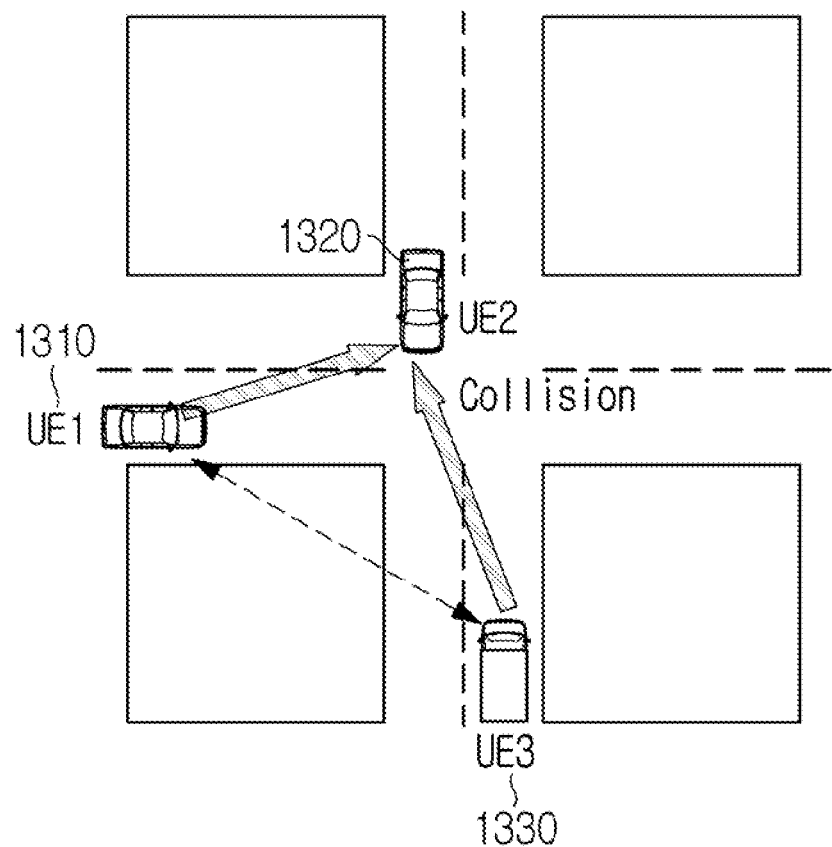
FIG. 13 illustrates a method of performing, by a coordination user equipment (C-UE), a resource coordination procedure based on a resource collision to which the present disclosure may apply.

For example, FIG. 13 illustrates a method of performing, by a C-UE, a resource coordination procedure based on a resource collision to which the present disclosure may apply. For example, referring to FIG. 13, a first UE (UE1) 1310 and a third UE (UE3) 1330 may be Tx UEs and may be in a state in which they are unaware of each other due to an obstacle. Here, a second UE (UE2) 1320 may be an Rx UE or a C-UE. The UE2 1320 may trigger the resource coordination procedure in consideration of signals transmitted from the UE1 1310 and the UE3 1330.

In detail, the UE2 1320 may receive SCI format 1-A and/or SCI format 2 (e.g., 2-A, 2-B, or 2-C) from neighboring Tx UEs (UE1 1310 and UE3 1330). The UE2 1320 may verify at least one of resource reservation and allocation information received from an SCI format, ID information associated with each Tx UE, cast type information, and HARQ operation status information. Here, the ID information may include at least one of a source ID and a destination ID. Here, when a portion of or all of the reserved and scheduled resource information and allocation information overlaps, an RSRP measurement value of SCI received to indicate and reserve the overlapping resource may be verified. Here, a case in which a portion of or all of the reserved and scheduled resource information and allocation information overlaps may include a case before the collision occurs or a case in which the collision has already occurred by verifying reservation and scheduling resource information from the SCI format. Here, if an RSRP measurement value of received SCI is greater than a first threshold and a difference in RSRP measurement values of SCI formats received from the Tx UEs or each RSRP measurement value is less than a second threshold, the C-UE may trigger the coordination resource procedure. This threshold application method may apply to a case in which the C-UE is an Rx UE that is a UE intended by the corresponding SCI formats. Here, the first threshold and the second threshold may be configured by priority values within the SCI formats received from the neighboring Tx UEs, each priority value (prio_RX), or upper layer parameters (e.g., ThresRSRP (prio_Rx #0, prio_Rx #1, . . . ) for each combination. The first threshold may preferentially consider an SCI format having an RSRP value greater than the corresponding threshold in consideration of priority for data transmission associated with the received SCI formats, for the coordination resource procedure. Additionally, the second threshold may be considered to configure a difference in RSRP values of one or more received SCI formats or a level of an RSRP value of each of the received SCI formats. In the latter case, the second threshold may correspond to a threshold of an RSRP measurement value of a minimum considerable SCI format. When the above condition is satisfied and resource coordination information is triggered, the C-UE may provide resource coordination information to a specific Tx UE or an arbitrary Tx UE by considering at least one of a source ID and a destination ID within a $2^{nd}$ SCI format. Here, for example, the C-UE may not verify the source ID and destination ID information based on at least one of a cast type of the Tx UE and an HARQ operation status. Here, the source ID and destination ID information may be included in the $2^{nd}$ SCI format for at least one of the cast type and the HARQ operation and thereby transmitted. Therefore, the C-UE needs to decode all of $1^{st}$ SCI and $2^{nd}$ SCI received from the neighboring Tx UEs to verify the corresponding information. Here, when the C-UE decodes only the Pt SCI, the C-UE may transmit resource coordination information to neighboring Tx UEs through broadcast instead of transmitting the resource coordination information to the specific Tx UE.

As another example, if an RSRP measurement value of an SCI format received to indicate and reserve an overlapping resource is greater than a threshold, the C-UE may trigger the resource coordination procedure. Here, the threshold may be configured by upper layer parameter (e.g., ThresRSRP (prio_Rx)) based on a priority (prio_RX) value within the received SCI format.

As another example, if sidelink HARQ feedback is enabled in the C-UE and the C-UE receives NACK information greater than a specific threshold (e.g., ThresNACK (prio_Rx)), the C-UE may trigger the resource coordination procedure. Also, for example, when a data reception collision is detected, such as in a case in which the C-UE detects at least one PSCCH/PSSCH transmission having a low RSRP value and fails in data decoding, the C-UE may trigger the resource coordination procedure.

Figure 14:
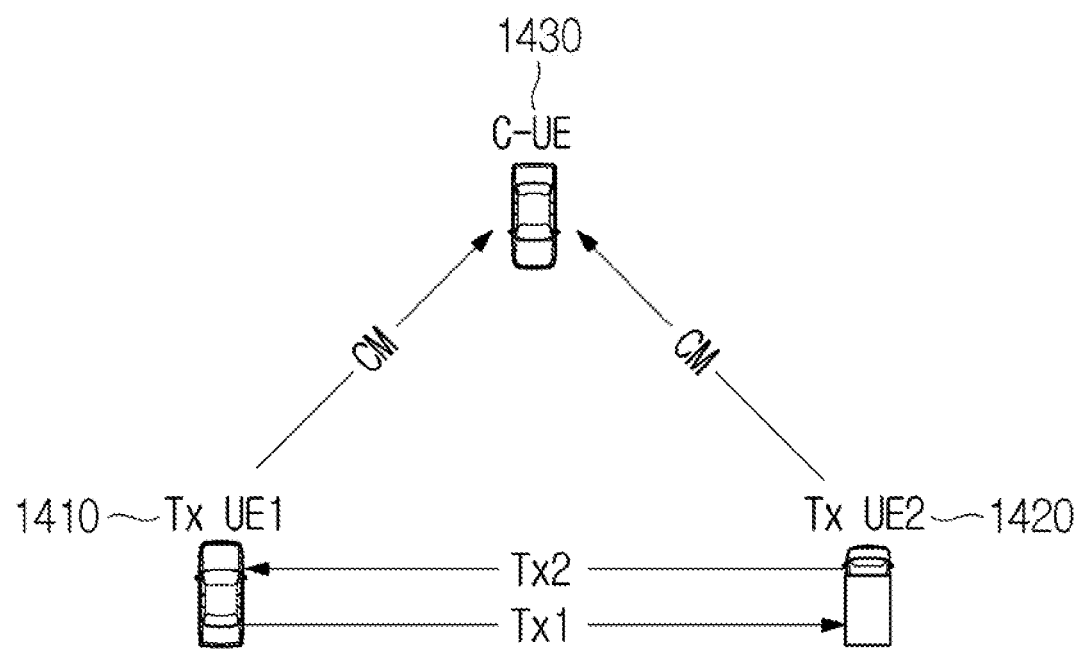
FIG. 14 illustrates a method of triggering a coordination resource procedure based on a resource collision to which the present disclosure may apply.

As another example, FIG. 14 illustrates a method of triggering a coordination resource procedure based on a resource collision to which the present disclosure may apply.

Referring to FIG. 14, a first UE (UE1) 1410 and a second UE (UE2) 1420 may be Tx UEs. Here, a C-UE 1430 may verify resource reservation information and allocation information of the UE1 1410 and the UE2 1420. Here, when the UE1 1410 and the UE2 1420 perform the same sidelink transmission on the same time, the C-UE 1430 may recognize the aforementioned situation and may trigger the coordination resource procedure.

Here, the C-UE 1430 may receive SCI from a neighboring Tx UE and may verify SCI format information. At least one of a resource in which transmission is reserved by the corresponding Tx UE and resource allocation information, ID information, cast type information, and HARQ operation status information may be verified within the received SCI format (SCI format 1-A and/or SCI format 2 (e.g., 2-A, 2-B or 2-C). Here, the ID information may include at least one of a source ID and a destination ID. When transmission is performed through a resource reserved or allocated by the Tx UE, the C-UE may verify whether the resource overlaps on the same time. Here, a case in which a portion of or all of the reserved and schedule resource information and allocation information overlaps may include a case before the collision occurs or a case in which the collision has already occurred by verifying reservation and scheduling resource information from the SCI format. Here, the C-UE may verify an RSRP measurement value of SCI that indicates the overlapping resource and indicates reservation. Here, if the RSRP measurement value of received SCI is greater than a first threshold and a difference in RSRP measurement values of SCI formats received from Tx UEs or each RSRP measurement value is less than a second threshold, the C-UE may trigger the coordination resource procedure. Here, the first threshold and the second threshold may be configured by priority values within the received SCI formats, each priority (prio_RX) value, or upper layer parameters (e.g., ThresRSRP(prio_Rx #0, prio_Rx #1, . . . ) for each combination. The first threshold may preferentially consider an SCI format having an RSRP value greater than the corresponding threshold in consideration of priority for data transmission associated with the received SCI formats, for the coordination resource procedure. Additionally, the second threshold may be considered to configure a difference in RSRP values of one or more received SCI formats or a level of an RSRP value of each of the received SCI formats. In the latter case, the second threshold may correspond to a threshold of an RSRP measurement value of a minimum considerable SCI format. When the above condition is satisfied and resource coordination information is triggered, the C-UE may provide resource coordination information to a specific Tx UE or an arbitrary Tx UE by considering at least one of a source ID and a destination ID within a $2^{nd}$ SCI format. Here, for example, the C-UE may not verify the source ID and destination ID information based on at least one of a cast type of the Tx UE and an HARQ operation status. Here, the source ID and destination ID information may be included in the $2^{nd}$ SCI format for at least one of the cast type and the HARQ operation and thereby transmitted. Therefore, the C-UE needs to decode all of Pt SCI and $2^{nd}$ SCI received from the neighboring Tx UEs to verify the corresponding information. Here, when the C-UE decodes only the Pt SCI, the C-UE may transmit resource coordination information to neighboring Tx UEs through broadcast instead of transmitting the resource coordination information to the specific Tx UE.

As another example, if an RSRP measurement value of an SCI format received to indicate and reserve an overlapping resource is greater than a threshold, the C-UE may trigger the resource coordination procedure. Here, the threshold may be configured by upper layer parameter (e.g., ThresRSRP (prio_Rx)) based on a priority (prio_RX) value within the received SCI format.

Here, for example, only when all the conditions corresponding to FIGS. 13 and 14 are satisfied, the resource coordination procedure may also be triggered.

Also, for example, a resource overlapping status may be determined based on a specific period of time. That is, validity for resource overlapping may be identified during the specific period of time. In detail, the specific period of time may be considered to determine resource overlapping. The C-UE may define that a resource overlapping status verified from received SCI format information is valid up to a time before a specific period of time (e.g., T4 time (unit: ms, the number of OFDM symbols or the number of slots) compared to a period of time corresponding to the actually overlapping resource. Here, the time before the specific period of time may include an upper layer processing time and a processing time required for sidelink channel transmission and reception of a UE.

As another example, the C-UE may verify an overlapping resource and then define that it is valid during a specific period of time (e.g., T4 time (unit: ms, the number of OFDM symbols or the number of slots). Here, the specific period of time may be defined to be valid up to a time that includes an upper layer processing time and a processing time required for sidelink channel transmission and reception of a UE.

Also, the C-UE may verify whether an SCI format that is received by the C-UE and from which resource overlapping is verified is intended as an Rx UE and, based thereon, may differently determine a type of coordination information. For example, when the C-UE performs the resource coordination procedure as a third party, the C-UE may provide at least one Tx UE with information regarding at least which resource overlaps and ID information (e.g., source ID/destination ID/member ID) on overlapping another Tx UE and may perform the resource coordination procedure using the same although SCI reception is not intended.

Figure 15:
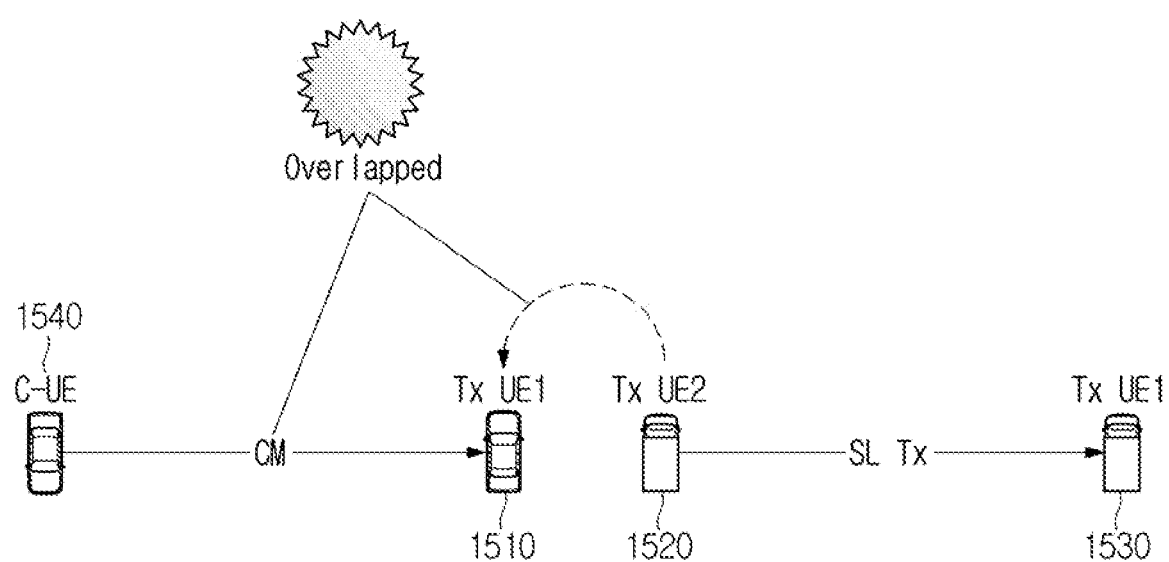
FIG. 15 illustrates a method of triggering a coordination resource procedure based on an exposed node issue to which the present disclosure may apply.

FIG. 15 illustrates a method of triggering a coordination resource procedure based on an exposed node issue to which the present disclosure may apply.

Referring to FIG. 15, a first UE (UE1) 1510 and a second UE (UE2) 1520 may be Tx UEs. The UE1 1510 may receive, from a C-UE 1540, CM information that includes a preferred resource or a nonpreferred resource. The UE1 1510 may perform a resource selection procedure for sidelink data transmission in consideration of the received CM information.

Here, in this process, when the UE2 1520 transmits SCI for performing sidelink transmission to the UE3 1530, the UE1 1510 may receive the SCI transmitted from the UE2 1520. Here, the corresponding SCI may include SCI format 1-A. Also, the corresponding SCI may additionally include SCI format 2-A or SCI format 2-B. Here, SCI format 1A may include resource allocation and resource reservation information and SCI format 2 (2-A/2-B) may include source ID information and destination ID information of a UE for corresponding sidelink data transmission. That is, the UE1 1510 may decode SCI transmitted from the UE2 1520 and may recognize that the UE2 1520 selects a resource for sidelink data transmission to the UE3 1530.

Here, when a transmission resource of the UE1 1510 and a transmission resource of the UE2 1520 overlap, a corresponding resource may not be excluded from a transmission candidate resource set although an RSRP value of SCI is greater than a threshold. In detail, through a resource sensing procedure performed to generate CM information, the C-UE 1540 may provide the CM information on a preferred resource or a nonpreferred resource for sidelink data reception to the UE1 1510. Here, the UE1 1510 may determine a transmission resource based on information received from the C-UE 1540. Here, although the C-UE 1540 may receive a transmission signal transmitted from the UE2 1520, a signal of the UE2 1520 may be weak considering a mutual distance. Therefore, although the corresponding resource overlaps a resource of the UE2 1520, the C-UE 1540 may select the corresponding resource as a preferred resource in consideration of the fact that the transmission signal is weak. Therefore, although the UE1 1510 verifies SCI of the UE2 1520 based on the CM information received from the C-UE 1540, the UE1 1510 may not exclude the overlapping resource as the transmission resource.

Regarding a detailed operation, the UE1 1510 may receive CM information from the C-UE 1540. Here, the CM information may include coordination resource information. The UE1 1510 may receive and decode SCI of neighboring UEs by sensing transmission of the neighboring UEs. When resource allocation and reservation information verified from the SCI received by the UE1 1510 overlaps preferred resource information through coordination resource information, the UE1 1510 may not exclude the overlapping resource from the candidate resource set based on CM information of the C-UE 1540. That is, the UE1 1510 may provide a candidate set to an upper layer and may use the same as a final transmission candidate resource without excluding the corresponding resource from the candidate resource set for sidelink data transmission.

Figure 16:
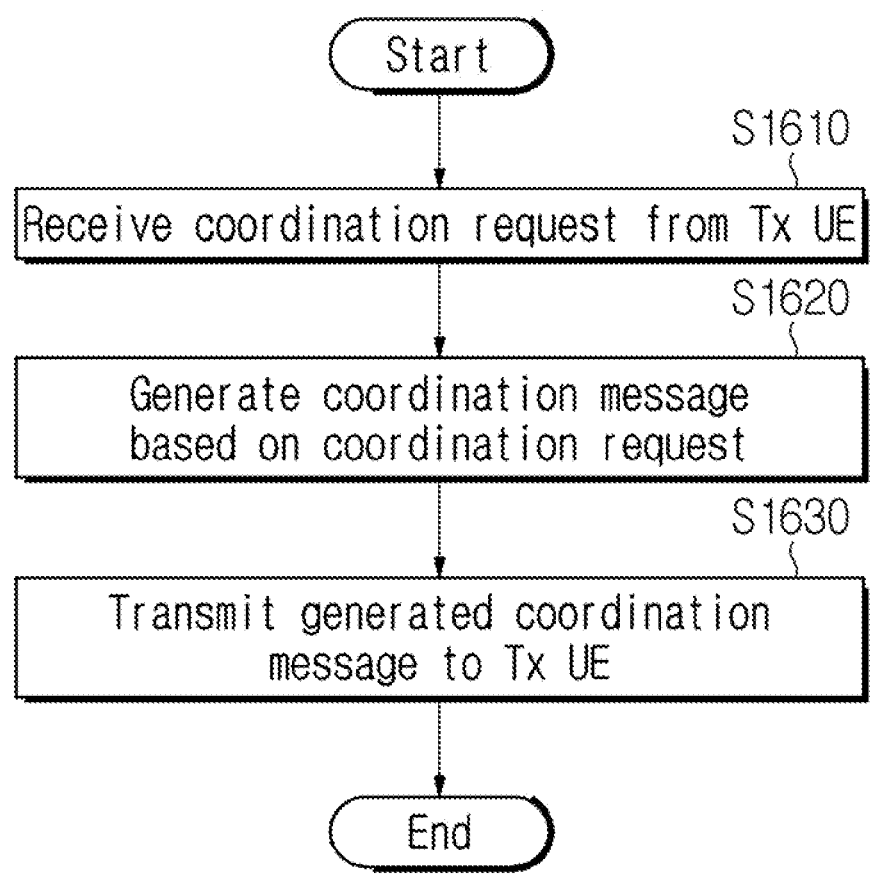
FIG. 16 is a flowchart illustrating a method of transmitting, by a C-UE, a coordination message to a transmitting UE (Tx UE) based on explicit signaling to which the present disclosure may apply.

FIG. 16 is a flowchart illustrating a method of transmitting, by a C-UE, a coordination message to a Tx UE based on explicit signaling to which the present disclosure may apply.

Referring to FIG. 16, in operation S1610, the C-UE may receive a coordination request (CR) from the Tx UE. Here, the coordination request may be 1 bit or more information bits. That is, the coordination request may include 1-bit information indicating a case in which the Tx UE performs the coordination request to the C-UE or a case in which the Tx UE does not perform the coordination request to the C-UE. Alternatively, the coordinate request may include information bits greater than 1 bit to request information on a type of coordination information as well as a coordination request status. The C-UE may receive the coordination request based on at least one of a physical resource set of a PSFCH, a $1^{st}/2^{nd}$ SCI format, CRC scrambling and DMRS sequence, and PSSCH. For example, the physical resource set of the PSFCH for the coordination request may be separately configured. As another example, some physical resource sets among physical resource sets of the PSFCH for sidelink HARQ feedback may be configured for the coordination request. As another example, a new $1^{st}/2^{nd}$ SCI format for indicating the coordination request may be configured and, through this the coordination request may be indicated. As another example, the coordination request may be indicated through one of reserved bits within the SCI format. As another example, the coordination request may be indicated through CRC scrambling based on the above Equation 12 and Equation 13. As another example, as described above, the coordination request may be indicated through the DMRS sequence based on the above Equation 14 and Equation 15. As another example, corresponding request information may be included in an SL data channel PSSCH and thereby transmitted.

In operation S1620, the C-UE may generate a coordination message based on the coordination request. Here, the coordination message may include information on resource configuration of the Tx UE. For example, when the C-UE is an Rx UE, preferred resource information or nonpreferred resource information may be included in the coordination message. As another example, when the C-UE is a third UE, the C-UE may include resource allocation information using SCI information received from neighboring Tx UEs, which is described above.

In operation S1630, the C-UE may transmit the generated coordination message to the Tx UE. Here, the Tx UE may perform resource reselection based on the coordination message. For example, the Tx UE may directly reselect a resource based on the coordination message received from the C-UE. That is, as described above, it may be a non-hierarchical mutual coordination method.

Figure 17:
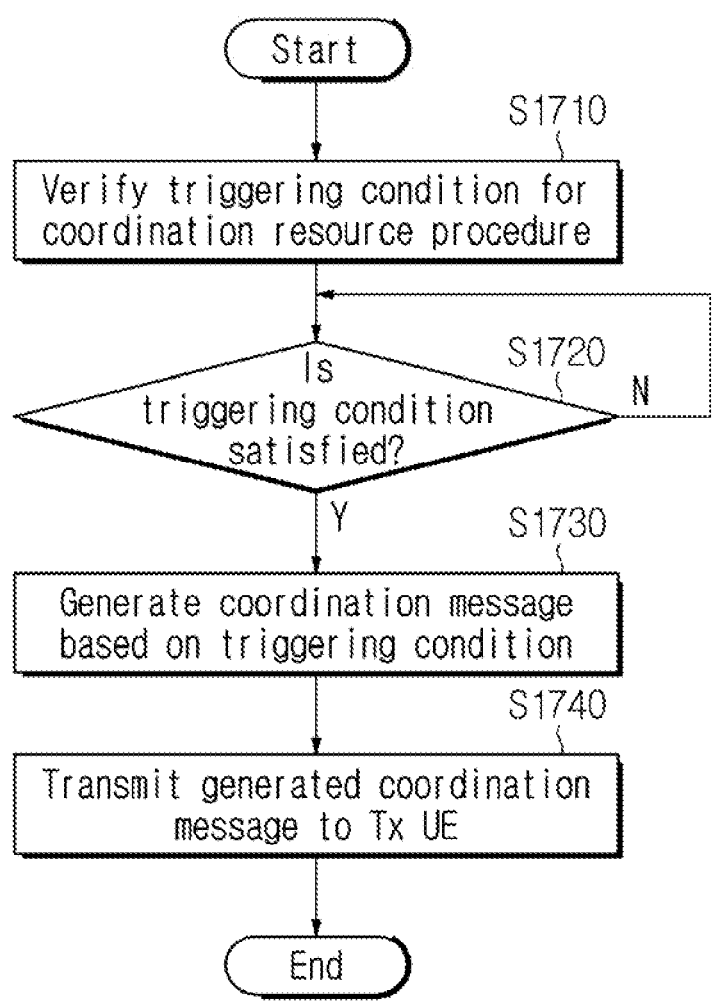
FIG. 17 is a flowchart illustrating a method of transmitting, by a C-UE, a coordination message to a Tx UE based on a triggering condition to which the present disclosure may apply.

FIG. 17 is a flowchart illustrating a method of transmitting, by a C-UE, a coordination message to a Tx UE based on a triggering condition to which the present disclosure may apply.

Referring to FIG. 17, in operation S1710, the C-UE may verify a triggering condition for a coordination resource procedure. In operation S1720, the C-UE may not receive a coordination request from the Tx UE and may generate a coordination message based on whether the triggering condition/configuration is satisfied. For example, as described above, the C-UE may configure the triggering condition that compares RSRP values of SCI received from neighboring Tx UEs to a threshold, and may generate the coordination message when the condition is satisfied in operation S1730. In operation S1740, the C-UE may transmit the generated coordination message to the Tx UE. Here, the Tx UE may perform resource reselection based on the coordination message. For example, the Tx UE may directly reselect a resource based on the coordination message received from the C-UE. That is, as described above, it may be a non-hierarchical mutual coordination method.

Figure 18:
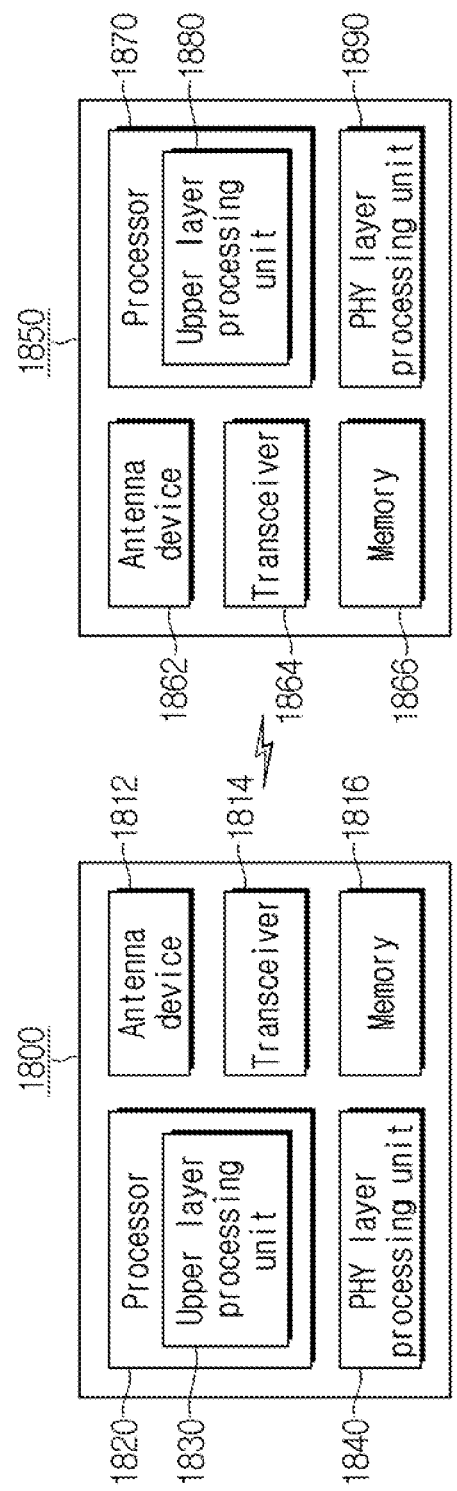
FIG. 18 is a diagram illustrating a base station device and a terminal device to which the present disclosure may apply.

FIG. 18 is a diagram illustrating a configuration of a base station device and a terminal device to which the present disclosure may apply.

A base station device 1800 may include a processor 1820, an antenna device 1812, a transceiver 1814, and a memory 1816.

The processor 1820 may perform baseband-related signal processing and may include an upper layer processing unit 1830 and a physical (PHY) layer processing unit 1840. The upper layer processing unit 1830 may process an operation of a medium access control (MAC) layer, a radio resource control (RRC) layer, or more upper layers. The PHY layer processing unit 1840 may process an operation (e.g., uplink received signal processing, downlink transmission signal processing, etc.) of a PHY layer. The processor 1820 may also control the overall operation of the base station device 1800, in addition to performing the baseband-related signal processing.

The antenna device 1812 may include at least one physical antenna. If the antenna device 1812 includes a plurality of antennas, multiple input multiple output (MIMO) transmission and reception may be supported. Also, beamforming may be supported.

The memory 1816 may store operation-processed information of the processor 1820, software, an operating system (OS), and an application related to an operation of the base station device 1800, and the like, and may include a component, such as a buffer.

The processor 1820 of the base station device 1800 may be configured to implement an operation of a base station in the embodiments set forth herein.

The terminal device 1850 may include a processor 1870, an antenna device 1862, a transceiver 1864, and a memory 1866. For example, in the present disclosure, the terminal device 1850 may communicate with the base station device 1800. As another example, in the present disclosure, the terminal device 1850 may perform sidelink communication with another terminal device. That is, the terminal device 1850 of the present disclosure refers to any device capable of communicating with at least one of the base station device 1800 and another terminal device and is not limited to communication with a specific device.

The processor 1870 may perform baseband-related signal processing and may include an upper layer processing unit 1880 and a PHY signal processing unit 1890. The upper layer processing unit 1880 may process an operation of a MAC layer, an RRC layer, or more upper layers. The PHY processing unit 1890 may process an operation (e.g., downlink received signal processing, uplink transmission signal processing, etc.) of a PHY layer. The processor 1870 may control the overall operation of the terminal device 1850 in addition to performing the baseband-related signal processing.

The antenna device 1862 may include at least one physical antenna. If the antenna device 1862 includes a plurality of antennas, MIMO transmission and reception may be supported. Also, beamforming may be supported.

The memory 1866 may store operation-processed information of the processor 1870, software, an OS, and an application related to an operation of the terminal device 1850, and the like, and may include a component such as a buffer.

Here, the processor 1870 of the terminal device 1850 may receive a coordination request (CR) from another terminal device (e.g., Tx UE) through the antenna device 1862. A coordination request may include 1-bit information to indicate a case in which the other terminal device performs the coordination request with respect to the terminal device 1850 or a case in which the other terminal device does not perform the coordination request with respect to the terminal device 1850. The processor 1870 of the terminal device 1850 may verify the coordination request based on at least one of a physical resource set of a PSFCH, an SCI format, CRC scrambling, and a DMRS sequence. For example, the physical resource set of the PSFCH for the coordination request may be separately configured. As another example, some physical resource sets among physical resource sets of the PSFCH for sidelink HARQ feedback may be configured for the coordination request. As another example, a new SCI format may be configured to indicate the coordination request and, through this, the coordination request may be indicated. As another example, the coordination request may be indicated through one of reserved bits within the SCI format. As another example, the coordination request may be indicated through CRC scrambling based on the above Equation 12 and Equation 13. As another example, as described above, the coordination request may be indicated through the DMRS sequence based on the above Equation 14 and Equation 15.

In operation S1620, the C-UE may generate the coordination message based on the coordination request. Here, the coordination message may include information related to resource configuration of the Tx UE. For example, when the C-UE is an Rx UE, preferred resource information or nonpreferred resource information may be included in the coordination message. As another example, when the C-UE is a third UE, the C-UE may include resource allocation information SCI received from neighboring Tx UEs, which is described above.

The processor 1870 of the terminal device 1850 may transmit the generated coordination message to another terminal device through the antenna device 1862. Here, the other terminal device may perform resource reselection based on the coordination message.

As another example, the processor 1870 of the terminal device 1850 may verify a triggering condition. Here, the processor 1870 of the terminal device 1850 may generate the coordination message depending on whether the triggering condition is satisfied, without receiving the coordination request from the other terminal device. The processor 1870 of the terminal device 1850 may set the triggering condition of comparing an RSRP value of SCI received from another neighboring terminal device and a set threshold and, when the triggering condition is satisfied, may generate the coordination message.

The processor 1870 of the terminal device 1850 may generate the generated coordination message to another terminal device through the antenna device 1862. Here, the other terminal device may perform resource reselection based on the coordination message.

The terminal device 1850 according to an example of the present disclosure may be associated with a vehicle. For example, the terminal device 1850 may be integrated in the vehicle, may be located in the vehicle, or may be located on the vehicle. Also, the terminal device 1850 according to the present disclosure may be the vehicle itself. Also, the terminal device 1850 according to the present disclosure may be at least one of a wearable terminal, AV/VR, an Internet of things (IoT) terminal, a robot terminal, and a public safety terminal. The terminal device 1850 to which the present disclosure may apply may include various types of communication devices that support an interactive service using sidelink, for services, for example, Internet access, service execution, navigation, real-time information, autonomous driving, and safety-and-risk diagnosis. Also, the terminal device 1850 may include an AR/VR device capable of performing a sidelink operation or any type of communication devices capable of performing a relay operation as a sensor.

Here, the vehicle to which the present disclosure applies may include an autonomous vehicle, a semi-autonomous vehicle, and a non-autonomous vehicle. Meanwhile, the terminal device 1850 according to an example of the present disclosure is described in association with the vehicle, at least one of the UEs may not be associated with the vehicle. It is provided as an example only and should not be interpreted to limit application of the present disclosure.

Also, the terminal device 1850 according to an example of the present disclosure may include various types of communication devices capable of performing coordination that supports an interactive service using sidelink. That is, the terminal device 1850 may directly support the interactive service using a sidelink and may be employed as a coordination device for supporting the interactive service using the sidelink.

Also, various examples of the present disclosure may be implemented by hardware, firmware, software, or combination thereof. In the case of implementation by hardware, the examples may be implemented by one or more application-specific integrated circuits (ASICs), digital signal processors (DSPs), digital signal processing devices (DSPDs), programmable logic devices (PLDs), field programmable gate arrays (FPGAs), general processors, controllers, microcontrollers, microprocessors, etc.

The scope of the present disclosure includes software or machine-executable instructions (e.g., OS, application, firmware, program, etc.) such that operations of the method of the various examples may be executed on an apparatus or a computer, and a non-transitory computer-readable medium storing such software or instructions to be executable on an apparatus or a computer.

Various embodiments of the present disclosure are to explain representative aspects of the present disclosure rather than listing all the possible combinations and matters described in the various embodiments may be applied alone or in combination of at least two of the embodiments.

What is claimed is:

1. A method comprising:
   receiving, by a first wireless user device from a second wireless user device, a coordination request comprising:
      a first bit indicating that the second wireless user device requests coordination information; and
      a second bit indicating a preferred resource or a non-preferred resource;
   generating, based on the coordination request, a coordination message; and
   transmitting the generated coordination message to the second wireless user device.

2. The method of claim 1, wherein the coordination request comprises sidelink control information comprising the first bit and the second bit.

3. The method of claim 2, wherein the sidelink control information is a sidelink control information format 2-C.

4. The method of claim 2, wherein the sidelink control information is a second stage sidelink control information format.

5. The method of claim 4, further comprising:
   receiving a sidelink control information format 1 comprising a second stage sidelink control information format field indicating a sidelink control information format 2-C as the second stage sidelink control information format.

6. The method of claim 1, wherein the coordination request further comprises at least one of:
   priority information;
   a number of subchannels per slot;
   a resource reservation period; or
   an indication associated with a resource coordination message (CM) window location.

7. The method of claim 6, wherein the coordination request further comprises:
   a source identifier; and
   a destination identifier.

8. The method of claim 6, wherein the CM window location comprises at least one of:
   a CM window starting point; or
   a CM window end point.

9. The method of claim 1, further comprising:
   receiving, by the first wireless user device from the second wireless user device, sidelink data,
   wherein the coordination message is for the second wireless user device for performing resource reselection for transmission of sideilnk data.

10. The method of claim 1, wherein when the first wireless user device receives the coordination request, the second wireless user device is in a mode in which the second wireless user device directly determines a sidelink transmission resource.

11. The method of claim 1, wherein the first bit comprised in the coordination request is configured to indicate whether the first wireless user device provides coordination information or the second wireless user device requests coordination information.

12. The method of claim 1, further comprising:
   transmitting, from the first wireless user device, coordination information comprising a bit indicating that the first wireless user device provides, based on a condition, the coordination information, wherein the bit comprised in the coordination information is configured to indicate whether the first wireless user device provides coordination information or the second wireless user device requests coordination information.

13. The method of claim 12, further comprising:
generating, based on the condition being satisfied, the coordination information,
wherein the condition is a condition for triggering a resource coordination procedure.

14. The method of claim 12, wherein the condition comprises a half-duplex communication.

15. The method of claim 12, wherein the coordination information comprises sidelink control information comprising the bit indicating that the first wireless user device provides, based on the condition, the coordination information.

16. The method of claim 15, wherein the sidelink control information is a sidelink control information format 2-C corresponding to a second stage sidelink control information format.

17. The method of claim 1, further comprising:
transmitting, from the first wireless user device via a physical sidelink feedback channel (PSFCH), signaling information indicating that a resource reselection is necessary.

18. The method of claim 17, wherein the transmitting the signaling information is further based on an expected resource conflict.

19. The method of claim 17, wherein the transmitting the signaling information is further based on a reference signal received power (RSRP) of received sidelink control information higher than a threshold.

* * * * *